United States Patent
Yamahara

(10) Patent No.: US 9,135,316 B2
(45) Date of Patent: Sep. 15, 2015

(54) INFORMATION PROVIDING DEVICE, METHOD, PROGRAM, INFORMATION DISPLAY DEVICE, METHOD, PROGRAM, INFORMATION SEARCH SYSTEM, AND RECORDING MEDIUM FOR ENHANCED SEARCH RESULTS

(75) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 149 days.

(21) Appl. No.: 13/816,678

(22) PCT Filed: Mar. 30, 2011

(86) PCT No.: PCT/JP2011/057942
§ 371 (c)(1),
(2), (4) Date: Feb. 12, 2013

(87) PCT Pub. No.: WO2012/131928
PCT Pub. Date: Oct. 4, 2012

(65) Prior Publication Data
US 2013/0151511 A1    Jun. 13, 2013

(51) Int. Cl.
*G06F 17/30* (2006.01)
(52) U.S. Cl.
CPC .... *G06F 17/30554* (2013.01); *G06F 17/30643* (2013.01); *G06F 17/30973* (2013.01)
(58) Field of Classification Search
CPC ................ G06F 17/30554; G06F 17/30643; G06F 17/30973
USPC ......................................................... 707/723
See application file for complete search history.

(56) References Cited

U.S. PATENT DOCUMENTS 7,660,822 B1   2/2010  Pfleger
8,463,790 B1*  6/2013  Joshi et al. ................... 707/738
8,549,042 B1* 10/2013  Pfleger ......................... 707/798

(Continued)

FOREIGN PATENT DOCUMENTS

| CN | 101950400 A | 1/2011 |
| JP | 9-167130 A  | 6/1997 |

(Continued)

OTHER PUBLICATIONS

Japanese Office Action issued Oct. 30, 2012 in corresponding Japanese Patent Application No. 2009-296617.

*Primary Examiner* — Tony Mahmoudi
*Assistant Examiner* — Merilyn Nguyen
(74) *Attorney, Agent, or Firm* — Sughrue Mion, PLLC

(57) ABSTRACT

An information providing device includes a search result information transmission means that transmits search result information, which indicates one or more pieces of information of information that has been searched for by an information search device, to a terminal device, a graph display information transmission means that transmits graph display information for displaying a graph showing a relationship between display order in which the information that has been searched for by the information search device as the search result and a value of a predetermined presentation item related to the information is displayed, and a range indication display information transmission means that transmits range indication display information for displaying predetermined range indication information at a position in the graph, the position indicating a display range being a range of the information indicated by the search result information.

23 Claims, 11 Drawing Sheets

(56) References Cited

U.S. PATENT DOCUMENTS

| | | |
|---|---|---|
| 8,745,039 B2 * | 6/2014 | Dube et al. .................... 707/722 |
| 2005/0080769 A1 | 4/2005 | Gemmell et al. |
| 2006/0053176 A1 | 3/2006 | Thorpe et al. |
| 2009/0307145 A1 * | 12/2009 | Mesaros ........................ 705/80 |
| 2010/0131491 A1 | 5/2010 | Lemaire et al. |
| 2010/0153370 A1 * | 6/2010 | Gollapudi et al. ............ 707/722 |

FOREIGN PATENT DOCUMENTS

| | | |
|---|---|---|
| JP | 2001-188796 A | 7/2001 |
| JP | 2003-256472 A | 9/2003 |
| JP | 2004-94813 A | 3/2004 |
| JP | 2006-127484 A | 5/2006 |
| JP | 2010-262596 A | 11/2010 |
| TW | 200844883 A | 11/2008 |

* cited by examiner

FIG.8
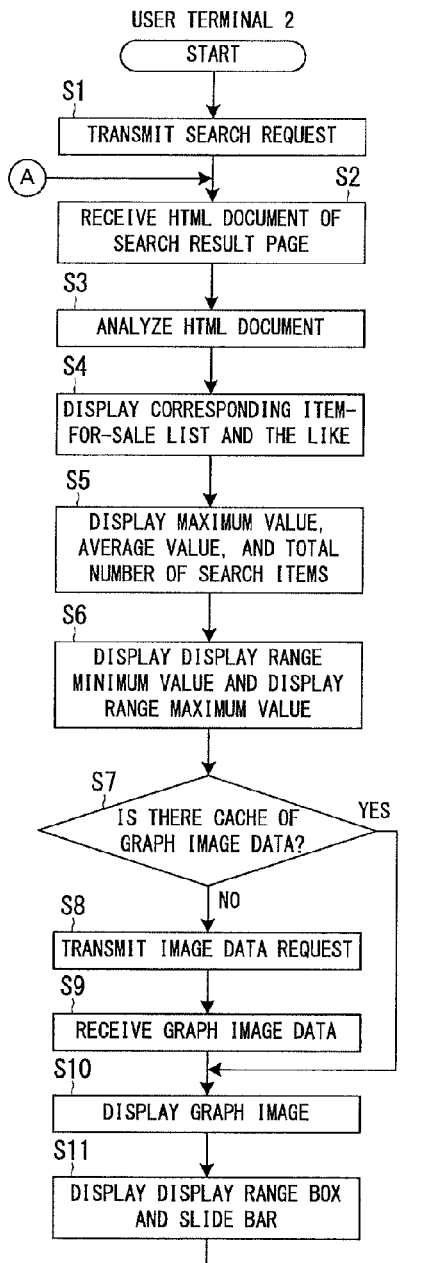
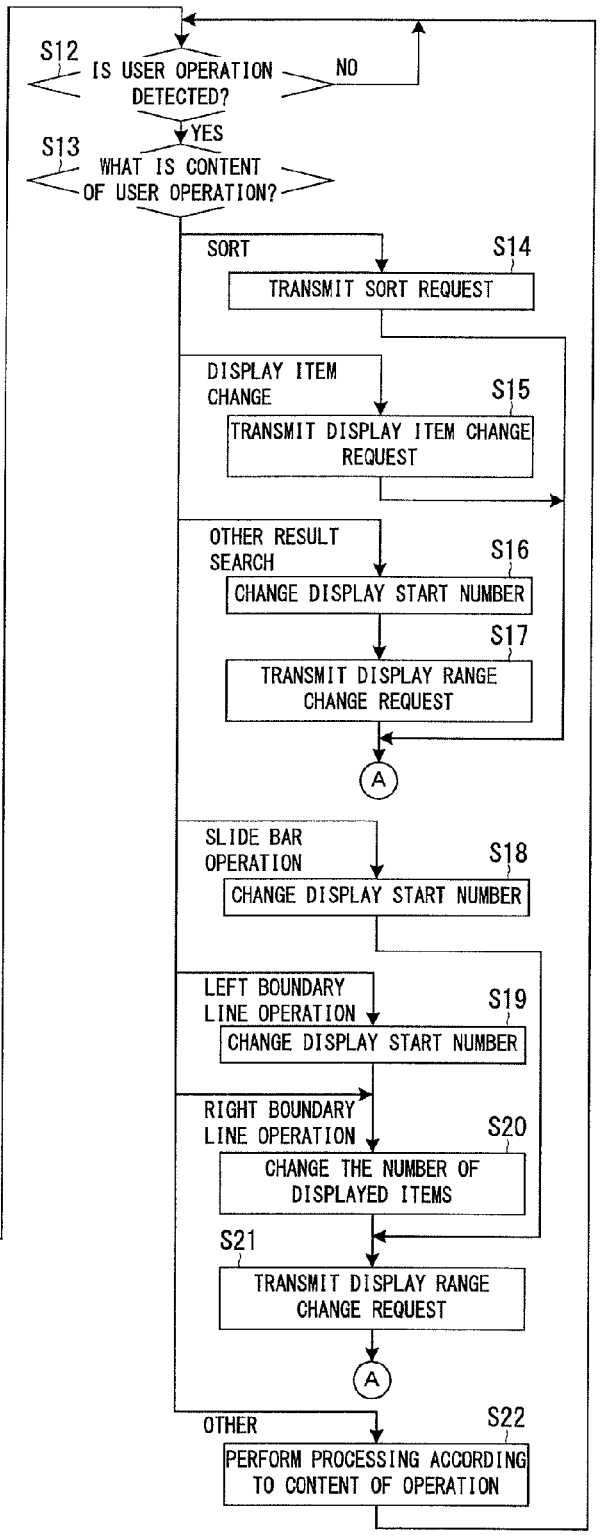

INFORMATION PROVIDING DEVICE, METHOD, PROGRAM, INFORMATION DISPLAY DEVICE, METHOD, PROGRAM, INFORMATION SEARCH SYSTEM, AND RECORDING MEDIUM FOR ENHANCED SEARCH RESULTS

CROSS REFERENCE TO RELATED APPLICATIONS

This application is a National Stage of International Application No. PCT/JP2011/057942 filed Mar. 30, 2011 the contents of all of which are incorporated herein by reference in their entirety.

TECHNICAL FIELD

The present invention relates to a technical field of an information display device, an information display method, an information display program, an information providing device, an information providing method, an information providing program, and an information providing system for displaying a search result which is a result of searching for information by an information search device.

BACKGROUND ART

Conventionally, an information search device that searches for information according to a request from a terminal device is known (for example, Patent Literature 1). The information search device transmits, for example, a Web page (hereinafter referred to as "search result page"), which displays a list of searched information as a search result, to the terminal device. The terminal device displays the search result page transmitted from the information search device, so that a user can browse the search result.

CITATION LIST

Patent Literature

Patent Literature 1: Japanese Patent Application Laid-Open No. H9-167130

SUMMARY OF INVENTION

Technical Problem

However, when searching for information using the information search device described in Patent Literature 1, it is possible to browse only information currently displayed in the list, and it is not possible to browse information that is not displayed in the list.

The present invention is made in view of the above situation and an object of the present invention is to provide an information providing device, an information providing method, an information providing program, an information display device, an information display method, an information display program, an information search system, and a recording medium, which enable a user to easily browse predetermined presentation number values of information other than the currently displayed information as a search result.

Solution to Problem

In order to achieve the above object, an invention described in claim 1 is an information providing device for transmitting a search result, which is a result of a search by an information search device and which is displayed by a terminal device, to the terminal device through a network according to a request from the terminal device, the information providing device comprising: a search result information transmission means that transmits search result information, which indicates one or more pieces of information of information that has been searched for by the information search device, to the terminal device; a graph display information transmission means that transmits graph display information for displaying a graph showing a relationship between display order in which the information that has been searched for by the information search device is displayed as the search result and a predetermined presentation number value related to the information; and a range indication display information transmission means that transmits range indication display information for displaying predetermined range indication information at a position in the graph, the position indicating a display range being a range of the information indicated by the search result information.

According to the this invention, the terminal device displays one or more pieces of searched information on the basis of the search result information received from the information providing device. Also, the terminal device displays a graph showing a relationship between display in which the information that has been searched for is displayed and a predetermined presentation number on the basis of the graph display information received from the information providing device. Further, the terminal device displays the range indication information at a position in the graph, the position indicating the display range of the search result on the basis of the range indication display information received from the information providing device. A user can easily know the range in which the search result is currently displayed from the display position of the range indication information in the graph. Also, the user can easily know whether or not information where a predetermined presentation number value is within a desired range is present outside the range in which the search result is currently displayed from the graph and the range indication information. Therefore, the user can easily determine whether or not the user should browse the search result of information other than the information that is currently displayed as the search result.

An invention described in claim 2 is the information providing device according to claim 1, wherein the graph display information transmission means transmits the graph display information for displaying the graph that shows a relationship between the display order for the entirety of the search result and the presentation number value.

According to the this invention, the graph of all pieces of information that have been searched for is displayed, so that the user can easily know where the range in which the search result is currently displayed occupies in the entire search result.

An invention described in claim 3 is the information providing device according to claim 1 or 2, wherein the graph display information transmission means transmits the graph display information for displaying the graph in which the display order, in which the information that has been searched for by the information search device is displayed as the search result, is indicated by a horizontal axis and the predetermined presentation number value related to the information is indicated by a vertical axis.

An invention described in claim 4 is the information providing device according to any one of claims 1 to 3, further comprising: an information arrangement means that arranges the information that has been searched for by the information search device in order according to the predetermined presentation number, wherein the search result information transmission means transmits the search result information, which indicates one or more pieces of information of the information that has been searched for by the information search device and arranged by the information arrangement means, to the terminal device.

An invention described in claim 5 is the information providing device according to any one of claims 1 to 4, further comprising: a storage means that stores the presentation number values in association with respective pieces of the information; and an image data generation means that generates image data which represents the graph on the basis of the presentation number values corresponding to the information that has been searched for by the information search device as the graph display information, wherein the graph display information transmission means transmits the image data generated by the image data generation means to the terminal device.

According to the this invention, the terminal device can display the graph on the basis of the image data received from the information providing device, so that it is possible to reduce a processing load of the terminal device to display the graph.

An invention described in claim 6 is the information providing device according to any one of claims 1 to 5, wherein the search result information transmission means transmits page data that defines display content of a Web page displaying the search result information, the graph, and the range indication information to the terminal device.

According to the this invention, the terminal device can display the search result, the graph, and the range indication information by performing display processing of a Web page according to a definition of page data.

An invention described in claim 7 is the information providing device according to claim 6, wherein the search result information transmission means transmits the page data that displays an operation part for operating and changing the display range by a graphical user interface to the terminal device.

According to the this invention, it is possible to display a search result of a range that the user desires by a user operation on the terminal device.

An invention described in claim 8 is the information providing device according to anyone of claims 1 to 7, wherein the graph information transmission means matches the presentation number where the graph is displayed with an item which is a reference to determine the display order and transmits the graph display information.

According to the this invention, a monotonically increasing graph or a monotonically decreasing graph is displayed, so that the user can easily know where the range, in which information where a predetermined presentation number value is within a desired range, is located in the search result.

An invention described in claim 9 is the information providing device according to any one of claims 1 to 8, wherein the range indication display information includes information indicating the display range.

An invention described in claim 10 is an information providing method for transmitting a search result, which is a result of a search by an information search device and which is displayed by a terminal device, to the terminal device through a network according to a request from the terminal device, the information providing method comprising: a search result information transmission step of transmitting search result information, which indicates one or more pieces of information of information that has been searched for by the information search device, to the terminal device; a graph display information transmission step of transmitting graph display information for displaying a graph showing a relationship between display order in which the information that has been searched for by the information search device is displayed as the search result and a predetermined presentation number value related to the information; and a range indication display information transmission step of transmitting range indication display information for displaying predetermined range indication information at a position in the graph, the position indicating a display range being a range of the information indicated by the search result information.

An invention described in claim 11 is an information providing program that causes a computer, which is included in an information providing device for transmitting a search result, which is a result of a search by an information search device and which is displayed by a terminal device, to the terminal device through a network according to a request from the terminal device, to function as: a search result information transmission means that transmits search result information, which indicates one or more pieces of information of information that has been searched for by the information search device, to the terminal device; a graph display information transmission means that transmits graph display information for displaying a graph showing a relationship between display order in which the information that has been searched for by the information search device is displayed as the search result and a predetermined presentation number value related to the information; and a range indication display information transmission means that transmits range indication display information for displaying predetermined range indication information at a position in the graph, the position indicating a display range being a range of the information indicated by the search result information.

An invention described in claim 12 is a recording medium in which an information providing program is computer-readably recorded, the information providing program causing a computer, which is included in an information providing device for transmitting a search result, which is a result of a search by an information search device and which is displayed by a terminal device, to the terminal device through a network according to a request from the terminal device, to function as: a search result information transmission means that transmits search result information, which indicates one or more pieces of information of information that has been searched for by the information search device, to the terminal device; a graph display information transmission means that transmits graph display information for displaying a graph showing a relationship between display order in which the information that has been searched for by the information search device is displayed as the search result and a predetermined presentation number value related to the information; and a range indication display information transmission means that transmits range indication display information for displaying predetermined range indication information at a position in the graph, the position indicating a display range being a range of the information indicated by the search result information.

An invention described in claim 13 is an information display device for displaying a search result which is a result of a search by an information search device, the information display device comprising: a search result display means that displays search result information, which indicates one or more pieces of information of information that has been searched for by the information search device; a graph display means that displays a graph showing a relationship between display order in which the information that has been searched for by the information search device is displayed as the search result and a predetermined presentation number value related to the information; and a range indication information display means that displays range indication information on the graph, the range indication information indicating a display range by its display position, the display range being a range of the information indicated by the search result information displayed by the search result display means.

According to the this invention, a search result of one or more pieces of information that has been searched for is displayed on the information display device. Also, a graph is displayed which shows a relationship between display order in which the information that has been searched for is displayed and a predetermined presentation number. Further, the range indication information is displayed on the graph. Therefore, the user can easily know the range in which the search result is currently displayed from the display position of the range indication information in the graph. Also, the user can easily know whether or not information where a predetermined presentation number value is within a desired range is present outside the range in which the search result is currently displayed from the graph and the range indication information. Therefore, the user can easily determine whether or not the user should browse the search result of information other than the information that is currently displayed as the search result.

An invention described in claim 14 is the information display device according to claim 13, wherein the graph display means displays the graph that shows a relationship between the display order for the entirety of the search result and the presentation number value.

According to the this invention, the user can easily know where the range in which the search result is currently displayed occupies in the entire search result.

15. The information display device according to claim 13 or 14, wherein the graph display means displays the graph in which the display order, in which the information that has been searched for by the information search device is displayed as the search result, is indicated by a horizontal axis and the predetermined presentation number value related to the information is indicated by a vertical axis.

An invention described in claim 16 is the information display device according to any one of claims 13 to 15, further comprising: an information arrangement means that arranges the information that has been searched for by the information search device in order according to the predetermined presentation number, wherein the search result display means displays the search result information which indicates one or more pieces of information of the information that has been searched for by the information search device and arranged by the information arrangement means.

An invention described in claim 17 is the information display device according to any one of claims 13 to 16, further comprising: a change operation detection means that detects a change operation of the display range, wherein when the change operation is detected by the change operation detection means, the search result display means changes the display range and the range indication information display means changes at least one of the display position and a shape of the range indication information on the basis of the display range that has been changed.

According to the this invention, it is possible to display a search result of a range that the user desires.

An invention described in claim 18 is the information display device according to claim 17, further comprising: an operation part display means that displays an operation part which can be operated and moved in a direction of the display order in the graph, wherein when an operation to move the operation part is detected by the change operation detection means, the search result display means moves the display range according to a moving distance of the operation part and the range indication information display means moves the display position of the range indication information on the basis of the display range that has been moved.

According to the this invention, it is possible to easily display a search result of a range that the user desires when the user operates and moves the operation part.

An invention described in claim 19 is the information display device according to claim 17 or 18, wherein the range indication information includes a head part indicating a head of the display range and a tail part indicating a tail of the display range, the range indication display information display means displays the head part at a position corresponding to the head of the display range on the graph and displays the tail part at a position corresponding to the tail of the display range on the graph, and wherein when an operation to move one of the head part and the tail part is detected by the change operation detection means, the search result display means changes the number of pieces of the information included in the display range corresponding to the move of the head part and/or the tail part detected by the change operation detection means.

According to the this invention, when the user operates and moves the head part or the tail part, the user can easily match the display range of the search result with a range that the user desires.

An invention described in claim 20 is the information display device according to any one of claims 13 to 19, further comprising: a first value display means that displays a minimum value and a maximum value of the presentation number value in the information included in the display range.

According to the this invention, the user can easily know the range of a predetermined presentation number in the range of the currently displayed search result.

An invention described in claim 21 is the information display device according to any one of claims 13 to 20, further comprising: a second value display means that displays at least one of a maximum value and an average value of the presentation number value in a range of all pieces of the information that has been searched for by the information search device and the number of pieces of the information that has been searched for by the information search device.

According to the this invention, the user can easily grasp the whole picture of the search result.

An invention described in claim 22 is the information display device according to any one of claims 13 to 21, further comprising: a selection means that is for selecting the presentation number to be displayed from a plurality of presentation numbers, wherein the graph display means displays the graph of the presentation number selected by using the selection means.

According to the this invention, it is possible to display a graph of the presentation number desired by the user.

An invention described in claim 23 is an information display method for displaying a search result which is a result of a search by an information search device, the information display method comprising: a search result display step of displaying search result information, which indicates one or more pieces of information of information that has been searched for by the information search device; a graph display step of displaying a graph showing a relationship between display order in which the information that has been searched for by the information search device is displayed as the search result and a predetermined presentation number value related to the information; and a range indication information display step of displaying range indication information on the graph, the range indication information indicating a display range by its display position, the display range being a range of the information indicated by the search result information that is displayed.

Another invention is an information display program causes a computer, which is included in an information display device for displaying a search result which is a result of a search by an information search device, to function as: a search result display means that displays search result information, which indicates one or more pieces of information of information that has been searched for by the information search device; a graph display means that displays a graph showing a relationship between display order in which the information that has been searched for by the information search device is displayed as the search result and a predetermined presentation number value related to the information; and a range indication information display means that displays range indication information on the graph, the range indication information indicating a display range by its display position, the display range being a range of the information indicated by the search result information displayed by the search result display means.

Another invention is a recording medium in which an information display program is recorded, the information display program causing a computer, which is included in an information display device for displaying a search result which is a result of a search by an information search device, to function as: a search result display means that displays search result information, which indicates one or more pieces of information of information that has been searched for by the information search device; a graph display means that displays a graph showing a relationship between display order in which the information that has been searched for by the information search device is displayed as the search result and a predetermined presentation number value related to the information; and a range indication information display means that displays range indication information on the graph, the range indication information indicating a display range by its display position, the display range being a range of the information indicated by the search result information displayed by the search result display means.

Another invention is an information search system comprising: a terminal device; and an information search device that searches for information according to a request from the terminal device and transmits a search result to the terminal device through a network, wherein the information search device includes a search result reception means that receives a search condition transmitted from the terminal device, a search means that searches for the information which satisfies the search condition, a search result information transmission means that transmits search result information, which indicates one or more pieces of the information of the information that has been searched for by the search means, to the terminal device, a graph display information transmission means that transmits graph display information for displaying a graph showing a relationship between display order in which the information that has been searched for by the search means is displayed as the search result and a predetermined presentation number value related to the information, and a range indication display information transmission means that transmits range indication display information for displaying predetermined range indication information at a position in the graph, the position indicating a display range being a range of the information indicated by the search result information, and the terminal device includes a search condition transmission means that transmits the search condition to the information search device, an information reception means that receives the search result information, the graph display information, and the range indication display information transmitted from the information search device, a search result display means that displays the search result information, a graph display means that displays the graph based on the graph display information, and a range indication information display means that displays the range indication information at a position in the graph, the position indicating the display range on the basis of the range indication display information.

According to the this invention, the terminal device displays one or more pieces of information on the basis of the search result information received from the information providing device. Also, the terminal device displays a graph showing a relationship between the priority in which the information that has been searched for is displayed and a predetermined presentation number on the basis of the graph display information received from the information providing device. Further, the terminal device displays the range indication information at a position in the graph, the position indicating the display range of the search result on the basis of the range indication display information received from the information providing device. The user can easily know the range in which the search result is currently displayed from the display position of the range indication information in the graph. Also, the user can easily know whether or not information where a predetermined presentation number value is within a desired range is present outside the range in which the search result is currently displayed from the graph and the range indication information. Therefore, the user can easily determine whether or not the user should browse the search result of information other than the information that is currently displayed as the search result.

Another invention is the information search system descried above, wherein the information search device further includes a storage means that stores the presentation number values in association with respective pieces of the information, wherein the graph display information transmission means transmits the graph display information including the presentation number values corresponding to the information that has been searched for by the information search means, and the graph display means displays the graph based on the presentation number values included in the graph display information.

According to the this invention, the terminal device displays the graph on the basis of predetermined presentation number values received from the information providing device, so that it is possible to reduce a processing load of the information providing device.

Another invention is the information search system described above, wherein the information search device further includes a storage means that stores the presentation number values in association with respective pieces of the information, and an image data generation means that generates image data which represents the graph on the basis of the presentation number values corresponding to the information that has been searched for by the information search means as the graph display information, wherein the graph display means displays an image of the graph based on the image data.

According to the this invention, the terminal device can display the graph on the basis of the image data received from the information providing device, so that it is possible to reduce a processing load of the terminal device to display the graph.

Advantageous Effects of Invention

According to the present invention, the user can easily know the range in which the search result is currently displayed from the display position of the range indication information in the graph.

BRIEF DESCRIPTION OF DRAWINGS

FIG. 8 is a flowchart showing a process example of a system control unit 40 of the user terminal 2 according to the embodiment.

DESCRIPTION OF EMBODIMENTS

Hereinafter, an embodiment of the present invention will be described in detail with reference to the drawings. The embodiment described below is an embodiment where the present invention is applied to a shopping system in which items for sale are traded by exchange of electronic information on a network.

1. Schematic Configuration and Function of Shopping System

First, a configuration and a schematic function of a shopping system S according to the embodiment will be described with reference to FIG. 1.

Figure 1:
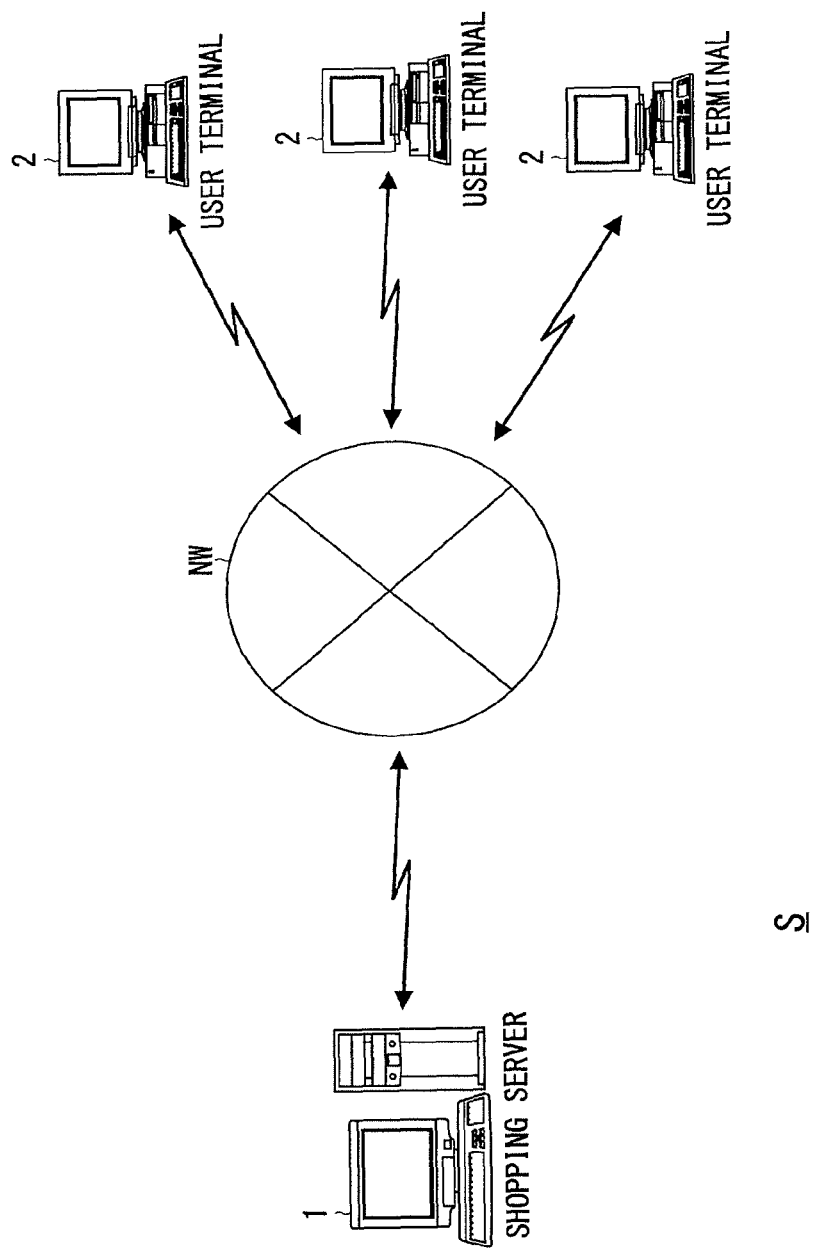
FIG. 1 is a diagram showing an example of a schematic configuration of a shopping system S according to an embodiment.

FIG. 1 is a diagram showing an example of a schematic configuration of the shopping system S according to the embodiment.

As shown in FIG. 1, the shopping system S is configured to include a shopping server 1, which is an example of an information providing device and an information search device, and a plurality of user terminals 2, each of which is an example of an information display device and a terminal device. The shopping server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), gateways, and the like.

In the shopping system S having such a configuration, the shopping server 1 is a Web server that transmits a Web page configuring a shopping site to a user terminal 2 according to a request from the user terminal 2. The shopping server 1 performs processes such as searching for an item for sale and purchasing an item for sale on the basis of the request from the user terminal 2 of a user who browses the Web page.

The user terminal 2 is a terminal device used by a user who purchases an item for sale on the shopping site. For example, a personal computer, a PDA (Personal Digital Assistant), and a mobile phone are used as the user terminal 2.

2. Configuration of Shopping Server

Next, a configuration of the shopping server 1 will be described with reference to FIG. 2.

Figure 2:
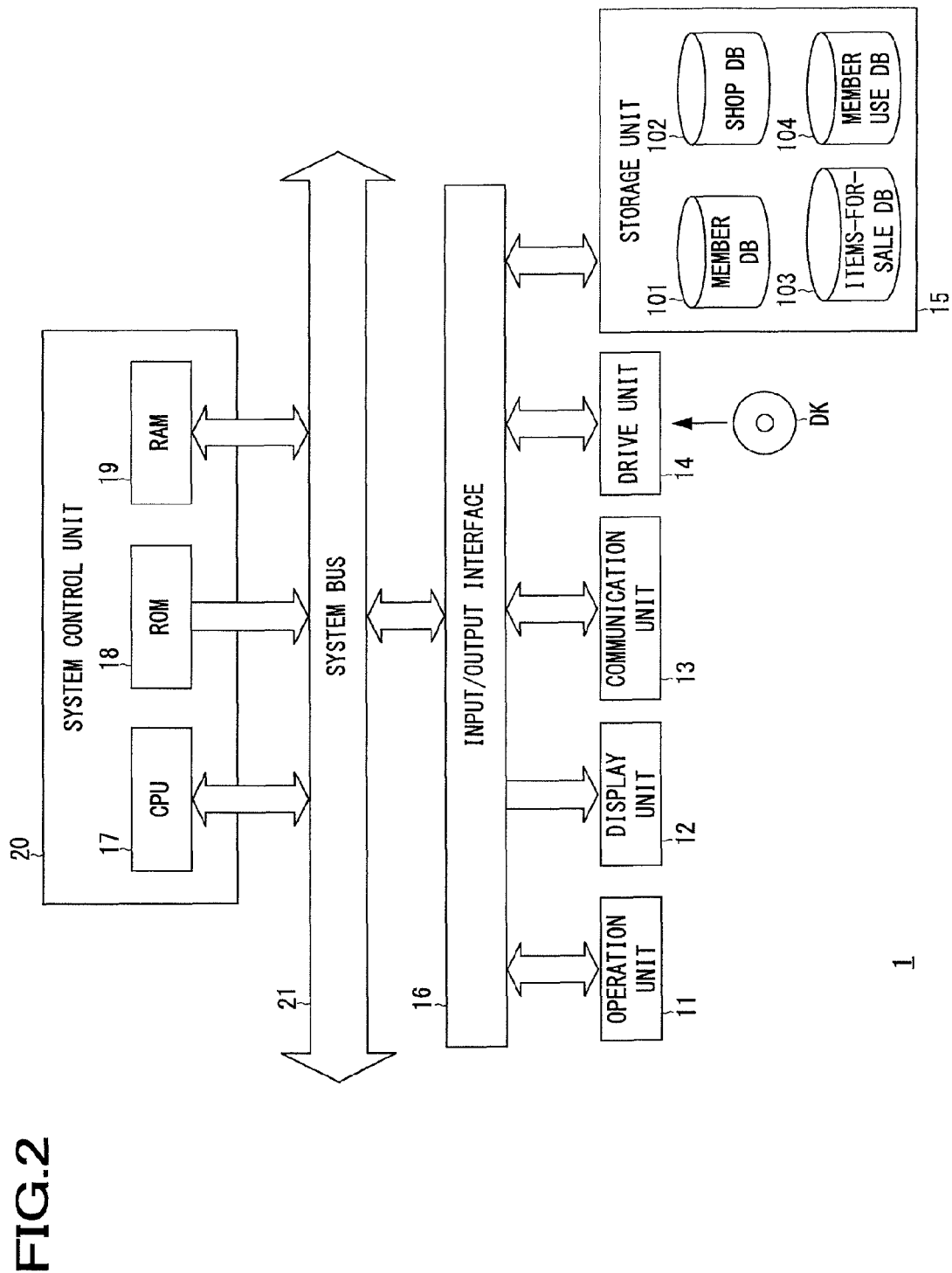
FIG. 2 is a block diagram showing an example of a schematic configuration of a shopping server 1 according to the embodiment.

FIG. 2 is a block diagram showing an example of a schematic configuration of the shopping server 1 according to the present embodiment.

As shown in FIG. 2, the shopping server 1 includes an operation unit 11, a display unit 12, a communication unit 13, a drive unit 14, a storage unit 15, an input/output interface unit 16, and a system control unit 20. The system control unit 20 and the input/output interface unit 16 are connected through a system bus 21.

The operation unit 11 includes, for example, a keyboard and a mouse, receives an operation instruction from an operator or the like, and outputs content of the instruction to the system control unit 20 as an instruction signal. The display unit 12 includes, for example, a CRT (Cathode Ray Tube) display or a liquid crystal display and displays information such as characters and images. The communication unit 13 connects to the network NW and controls communication state with the user terminals 2 and the like. The drive unit 14 reads data and the like from a disk DK such as, for example, a flexible disk, a CD (Compact Disc), and a DVD (Digital Versatile Disc) and records data and the like to the disk DK. The storage unit 15 includes, for example, a hard disk drive and stores various programs, data, and the like. The input/output interface unit 16 performs interface processing between the units from the operation unit 11 to the storage unit 15 and the system control unit 20. The system control unit 20 includes a CPU (Central Processing Unit) 17, a ROM (Read Only Memory) 18, a RAM 19, and the like.

The storage unit 15 configures an example of a storage means of the present invention. In the storage unit 15, various databases such as a member DB (database) 101, a shop DB 102, an items-for-sale DB 103, and a member use DB 104. In the member DB 101, information (for example, a member ID which is identification information of a user, a password, a name, an address, a telephone number, and an email address) related to users who are registered in the shopping site as a member is registered in association with each user. In the shop DB 102, information (for example, a shop ID which is identification information of a shop, a password, a name of the shop, an address, a telephone number, an email address, guide information of the shop, and evaluation from users) related to a shop that sells items for sale on a shopping site is registered in association with each shop. In the items-for-sale DB 103, information (for example, a shop ID of a shop that sells an item for sale, an item-for-sale ID which is identification information of the item for sale, an item-for-sale name, a price, explanatory information of the item for sale, an image related to the item for sale, a start date and time of the sale, impressions of the item for sale, and the number of the impressions) related to an item for sale that is sold on the shopping site is registered in association with each shop and each item for sale. In the member use DB 104, information of users (for example, a member ID, a purchase history, a browsing history, and information of favorite items for sale) related to use of the shopping site is registered in association with each user. The information registered in the shop DB 102 and the items-for-sale DB 103 is an example of information searched for in the present invention.

The storage unit 15 stores various HTML (Hyper Text Markup Language) documents, image data, voice data, text data, and the like which form a Web page of the shopping site.

Further, the storage unit 15 stores a predetermined operating system. The storage unit 15 also stores a WWW (World Wide Web) server program for transmitting a Web page to the user terminal 2 or the like on the basis of various data stored in the storage unit 15 according to a request transmitted from the user terminal 2 or the like by using an HTTP (Hyper Text Transfer Protocol) protocol. Furthermore, the shopping server 1 stores a shopping processing program that performs processing related to searching for an item for sale and purchasing an item for sale on the shopping site. For example, the various programs may be acquired from another server device or the like through the network NW or may be recorded in the disk DK such as a CD-ROM and read through a drive unit 14.

In the system control unit 20, the CPU 17 reads and executes various programs stored in the ROM 18 and the storage unit 15, so that the system control unit 20 controls each unit of the shopping server 1. The system control unit 20 functions as a search result information transmission means, a graph display information transmission means, a range indication display information transmission means, an image data generation means, a search result reception means, and a search means in the present invention.

The shopping server 1 may include a plurality of server devices such as, for example, a server that manages various databases, a search processing server that performs search processing of an item for sale, and a WWW server that provides various information.

3. Configuration of User Terminal

Next, a configuration of the user terminal 2 will be described with reference to FIG. 3.

Figure 3:
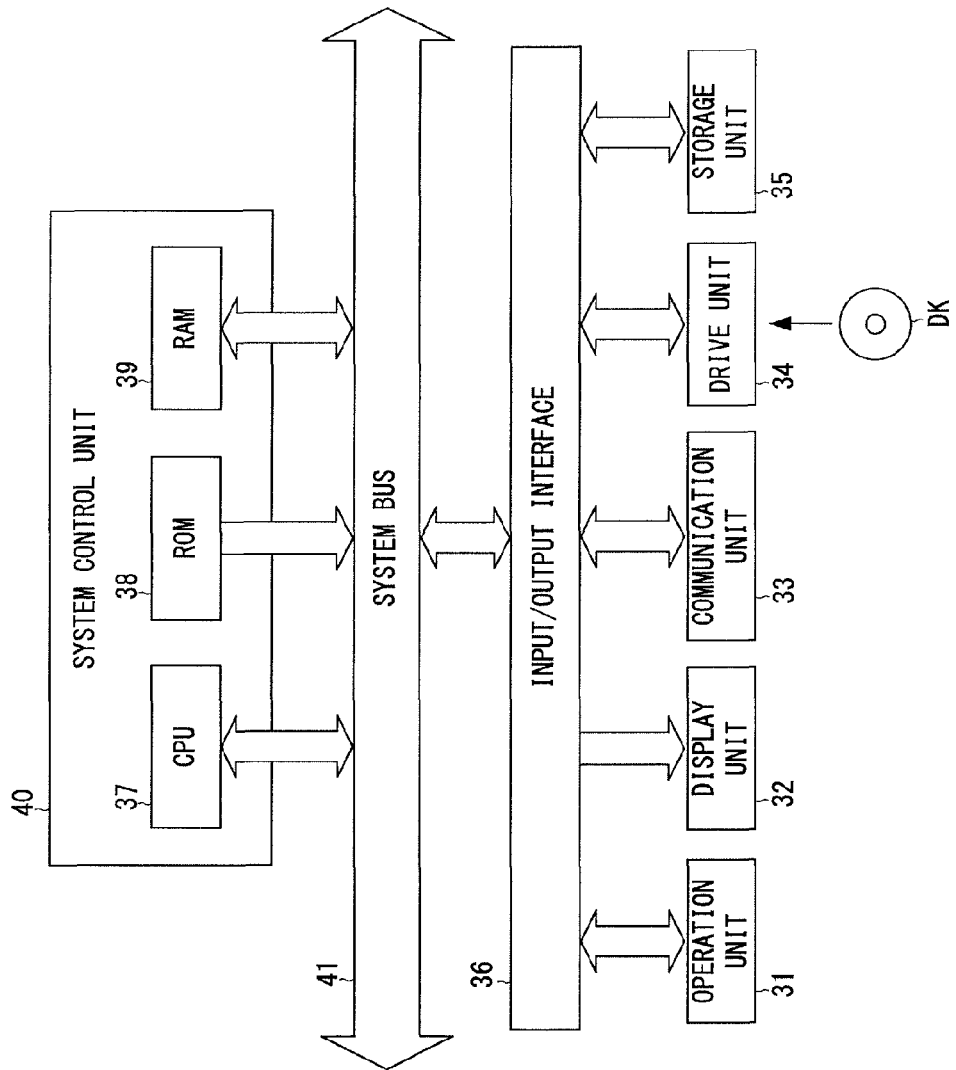
FIG. 3 is a block diagram showing an example of a schematic configuration of a user terminal 2 according to the embodiment.

FIG. 3 is a block diagram showing an example of a schematic configuration of the user terminal 2 according to the present embodiment.

As shown in FIG. 3, the user terminal 2 includes an operation unit 31, a display unit 32, a communication unit 33, a drive unit 34, a storage unit 35, an input/output interface unit 36, and a system control unit 40. The system control unit 40 and the input/output interface unit 36 are connected through a system bus 41.

The operation unit 31 includes, for example, a keyboard and a mouse, receives an operation instruction from a user, and outputs content of the instruction to the system control unit 40 as an instruction signal. The operation unit 31 configures an example of a selection means of the present invention. The display unit 32 includes, for example, a CRT (Cathode Ray Tube) display or a liquid crystal display and displays information such as characters and images. The communication unit 33 connects to the network NW and controls communication state with the shopping server 1 and the like. The drive unit 34 reads data and the like from a disk DK such as a flexible disk, a CD (Compact Disc), a DVD (Digital Versatile Disc), and a memory card, and records data and the like to the disk DK. The storage unit 35 includes, for example, a hard disk drive or a flash memory and stores various programs, data, and the like. The input/output interface unit 36 performs interface processing between the units from the operation unit 31 to the storage unit 35 and the system control unit 40. The system control unit 40 includes a CPU (Central Processing Unit) 37, a ROM (Read Only Memory) 38, a RAM 39, and the like.

The storage unit 35 stores a predetermined operating system, a Web browser program, and the like. For example, the various programs may be acquired from another server device or the like through the network NW or may be recorded in the disk DK such as a CD-ROM and read through a drive unit 34.

In the system control unit 40, the CPU 37 reads and executes various programs stored in the ROM 38 and the storage unit 35, so that the system control unit 40 controls each unit of the user terminal 2. The system control unit 40 functions as a search result display means, a graph display means, a range indication information display means, a change operation detection means, an operation part display means, a first value display means, a second value display means, a search condition transmission means, an information reception means, and a search result display means in the present invention.

4. Display of Search Result

Next, a mode of display of a search result when an item for sale is searched for in the shopping system S will be described with reference to FIGS. 4 to 7.

Figure 4:
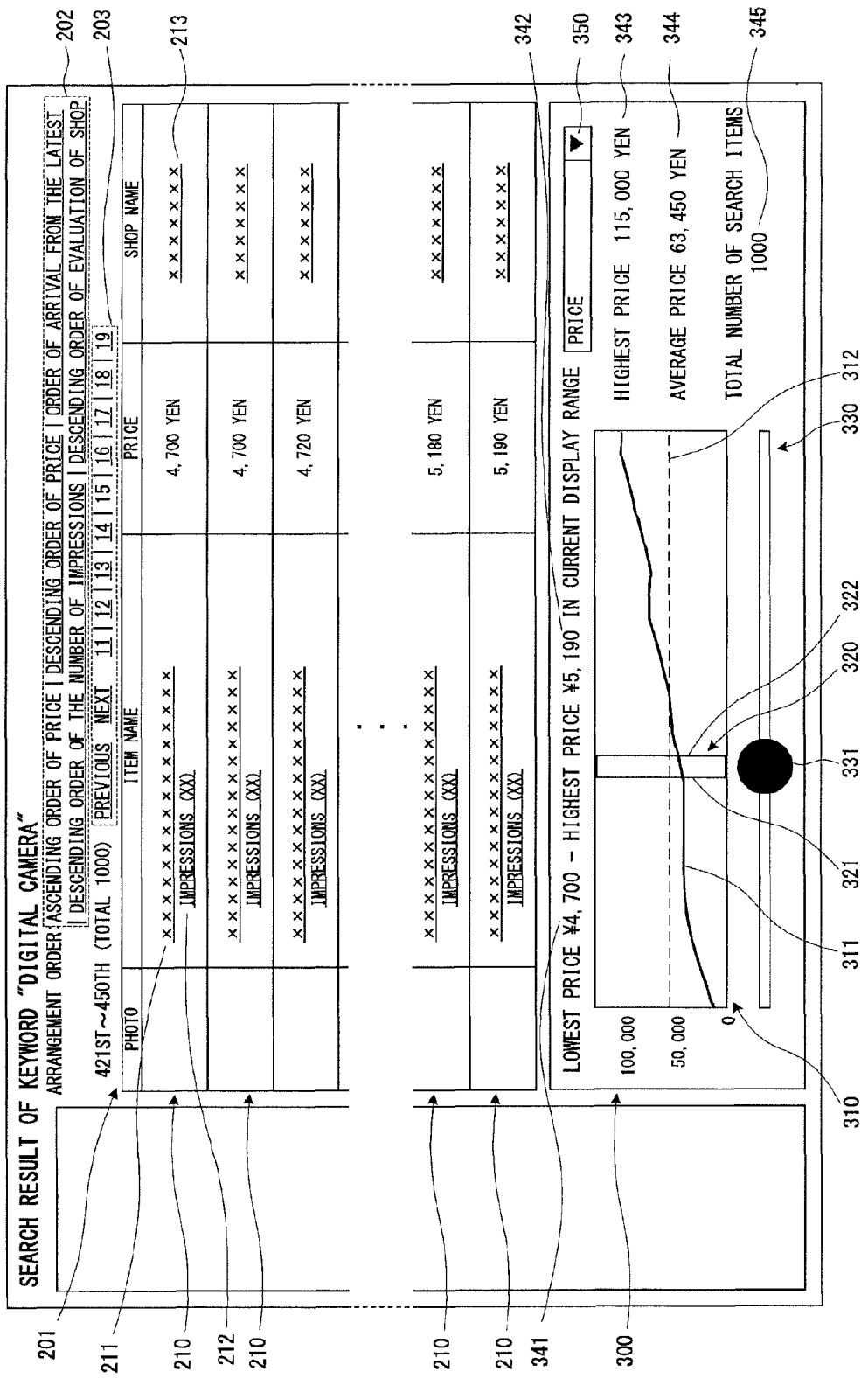
FIG. 4 is a diagram showing a screen display example of a search result page by the user terminal 2.

When the shopping server 1 searches for items for sale, the shopping server 1 transmits a Web page showing a list of items for sale that satisfy a search condition inputted by a user (hereinafter referred to as "corresponding items for sale") to the terminal device 2 as a search result. The Web page is referred to as "search result page". FIG. 4 is a diagram showing a screen display example of the search result page by the user terminal 2.

As shown in FIG. 4, on the search result page, a corresponding items-for-sale list 201 (an example of search result information), a sort condition link group 202, an other search result link group 203, a display item information display area 300, and the like are displayed.

In the corresponding items-for-sale list 201, a list of items for sale that satisfy the search condition is displayed. Specifically, the corresponding items-for-sale list 201 includes a plurality of pieces of one item information 210. The one item information 210 shows information of one corresponding item for sale. The one item information 210 includes an image of the item for sale, an item-for-sale link 211, an impression link 212, an item-for-sale price, and a shop link 213. The item-for-sale link 211 is a link (hyperlink) that displays a name of the item for sale corresponding to the link. The impression link 212 is a link that displays the number of impressions of the item for sale, which are registered by users who purchased the item for sale corresponding to the link. The shop link 213 is a link that displays a name of a shop that sells the item for sale corresponding to the link.

The number of the corresponding items for sale displayed in the corresponding items-for-sale list 201 is referred to as "the number of displayed items". The initial value of the number of displayed items is predetermined in the shopping system S. The initial value of the number of displayed items can be changed by user setting.

When the item-for-sale link 211 is selected by a user, the Web page changes to a Web page that displays detailed information of the item for sale corresponding to the link. When the impression link 212 is selected by a user, the Web page changes to a Web page that displays an impression of the item for sale corresponding to the link. When the shop link 213 is selected by a user, the Web page changes to a Web page that displays detailed information of the shop that sells the item for sale corresponding to the link.

The sort condition link group 202 includes a plurality of links for a user to select a sort condition. The sort condition indicates a condition to sort priority (order) in which the items for sale that satisfy the search condition are displayed in the search result. Examples of the sort condition include an ascending order of price of the item for sale, a descending order of price of the item for sale, an order of arrival from the latest, a descending order of the number of the impressions, and a descending order of evaluation of a shop that sells the item for sale. When any one of the links in the sort condition link group 202 is selected by a user, the priority order of the display of the corresponding items for sale is sorted in the sort condition corresponding to the selected link. Then, the list of the corresponding items for sale displayed in the corresponding items-for-sale list 201 is rearranged according to the sorted priority. In the corresponding items-for-sale list 201 of the search result page which is displayed for the first time after a search is performed, for example, pieces of the one item information 210 are displayed in order from the first corresponding item for sale according to the priority corresponding to the sort condition specified when the search condition is inputted.

The other search result link group 203 includes a plurality of links for changing to a search result page that displays a list of items for sale, which are items for sale that satisfy the search condition and which are different from the items for sale displayed as a list in the current corresponding item list 201. For example, a link that displays a page number is selected by a user, the Web page changes to a search result page of the page number corresponding to the link. When a link that displays "Previous" is selected, the Web page changes to a search result page previous to the currently displayed search result page. For example, when a list of the corresponding items for sale from the 421st item to the 450th item is displayed, if the link that displays "Previous" is selected, a list of the corresponding items for sale from the 391st item to the 420th item is displayed. When a link that displays "Next" is selected, the Web page changes to a search result page next to the currently displayed search result page. For example, when a list of the corresponding items for sale from the 421st item to the 450th item is displayed, if the link that displays "Next" is selected, a list of the corresponding items for sale from the 451st item to the 480th item is displayed.

The display item information display area 300 is an area in which information of a predetermined presentation number related to the items for sale that have been searched for. The item is referred to as "display item". Examples of the display item include a price, a sale start date, the number of impressions, and an evaluation value of a shop that sells the item for sale, which are the predetermined presentation numbers related to the items for sale that have been searched for. The information displayed in the display item information display area 300 basically corresponds to a reference item that determines the priority in the current sort condition. For example, when the sort condition is an ascending order of price or a descending order of price, the display item is the price. When the sort condition is an order of arrival from the latest, the display item is the sale start date. When the sort condition is a descending order of the number of impressions, the display item is the number of impressions. When the sort condition is a descending order of evaluation of a shop that sells the item for sale, the display item is the evaluation of a shop that sells the item for sale. In other words, the sort condition is an order according to an evaluation standard (for example, a descending order of price) which is the predetermined presentation number.

In the display item information display area 300, a graph area 310, a slide bar 330, a display range minimum value 341, a display range maximum value 342, a maximum value 343, an average value 344, a total number of search items 345, a display item selection menu 350, and the like are displayed.

The graph area 310 is a rectangular area, in which a graph 311 is displayed. The graph 311 is a line graph indicating a relationship between the priority order in which the items for sale that have been searched for is displayed and the values of the display item. Specifically, the horizontal axis (horizontal direction of the page) of the graph area 310 indicates the priority, that is, the display order of the items for sale that have been searched for, and the vertical axis (vertical direction of the page) indicates the value of the display item, that is, the predetermined presentation number value related to the items for sale that have been searched for (for example, the price). On the graph 311, a position on the left end in the vertical direction indicates a value of a corresponding item for sale of the highest priority, that is, a value of the display item of the first corresponding item for sale. As the graph 311 moves to the right, the graph 111 indicates a value of the display item of a corresponding item for sale of lower priority, and a position on the right end of the graph 311 in the vertical direction indicates a value of the display item of a corresponding item for sale of the lowest priority. The graph 311 shows variation of the value of the display item corresponding to the priority for the entire search result which is a whole range of the items for sale that have been searched for.

In the graph area 310, an average value line 312 is displayed. The average value line 312 is a horizontal line that indicates an average value of the display item of the items for sale that have been searched for. The average value line 312 is displayed corresponding to the graph 311, so that it is possible to visually check a position of the average value.

Further, a display range box 320 (an example of range indication information) is displayed in the graph area 310. The display range box 320 is a rectangle that indicates a range of corresponding items for sale that are listed in the corresponding items-for-sale list 201 in all the corresponding items for sale. The display range box 320 includes four sides. Of these sides, the left vertical side that determines one end of the display range is a left boundary line 321 (an example of a head part) and the right vertical side that determines the other end of the display range is a right boundary line 322 (an example of a tail part). The left boundary line 321 is displayed at a position corresponding to the priority of the first item for sale (the item for sale having the smallest display order) that is listed in the corresponding items-for-sale list 201. The right boundary line 322 is displayed at a position corresponding to the priority of the last item for sale (the item for sale having the largest display order) that is listed in the corresponding items-for-sale list 201. The display range box 320 is displayed on the graph 311, so that it is possible to visually check a range where the search result is currently displayed in the entire search result. The left boundary line 321 and the right boundary line 322 can be moved to the left or the right individually by a drag operation of a user. Here, the left direction is a direction along the horizontal axis of the graph area 310 and a direction in which the order indicated by the horizontal axis is decreased. On the other hand, the right direction is a direction along the horizontal axis of the graph area 310 and a direction in which the order indicated by the horizontal axis is increased. Thereby, it is possible to change the range of corresponding items for sale that are listed in the corresponding items-for-sale list 201.

For example, the slide bar 330 is displayed below the graph area 310. The slide bar 330 includes a knob 331 (an example of an operation part). The knob 331 is displayed at the same position in the horizontal direction as the display position of the display range box 320. The knob 331 can be moved in the horizontal direction by a drag operation of a user along a direction parallel with the horizontal axis direction of the graph area 310. In conjunction with the movement of the knob 331, the display range box 320 moves in the horizontal direction along a direction parallel with the horizontal axis direction of the graph area 310 (a direction indicating an order where the search result is displayed). Thereby, it is possible to change the range of corresponding items for sale that are listed in the corresponding items-for-sale list 201.

The maximum value 343 indicates a numerical value of the display item of the item for sale having the greatest value of the display item among the values of all the items for sale that have been searched for. The average value 344 indicates a numerical value of the average value of the display item of the items for sale that have been searched for. The total number of search items 345 indicates the number of the items for sale that have been searched for. The display range minimum value 341 indicates a numerical value of the display item of the item for sale having the smallest value of the display item among the items for sale listed in the corresponding items-for-sale list 201. The display range maximum value 342 indicates a numerical value of the display item of the item for sale having the greatest value of the display item among the items for sale listed in the corresponding items-for-sale list 201.

The display item selection menu 350 is a pull-down menu for selecting a display item whose information is caused to be displayed in the display item information display area 300.

Display images of the graph area 310, the graph 311, and the average value line 312 in the information displayed in the display item information display area 300 are generated as graph image data (an example of graph display image), which is image data for displaying graph, by the shopping server 1. When the user terminal 2 displays a search page on the basis of an HTML document, the user terminal 2 receives image data for displaying graph from the shopping server on the basis of a description of IMG tag of the HTML document. The user terminal 2 displays the image data for displaying graph on the search result page and also displays the display range box 320 and the slide bar 330. To display the display range box 320 and the knob 331 of the slide bar 330, for example, Ajax (Asynchronous JavaScript (registered trademark)+ XML) or the like is used. When a script described in the HTML document is executed, the display range box 320 and the slide bar 330 are displayed at a position corresponding to the range of the corresponding items for sale that are listed in the corresponding items-for-sale list 201 and the horizontal width of the display range box 320 is adjusted.

Next, an example of a user operation to the display item information display area 300 will be described.

In FIG. 4, the ascending order of price is selected as a sort condition. The number of items for sale that have been searched for is 1000. In the corresponding items-for-sale list 201, 30 pieces of one item information 210 of the corresponding items for sale from the 421st item to the 450th item (that is, from the item for sale having the 421st lowest price to the item for sale having the 450th lowest price) are displayed. On the other hand, the display item is the price. Therefore, the graph 311 shows a relationship between the priority order of the display of the search result and the price. In other words, the horizontal axis of the graph 310 represents the priority (order) of the display of the search result and the vertical axis represents the price which is the display item. The reference item of the sort condition and the display item correspond to each other (in other words, the search result is arranged in order according to the display numbers (price)) and the sort condition is the ascending order, so that the graph 311 is an increasing graph (a monotonically increasing graph in which as the order of the display increases, the value of the display item (price) increases). The left end of the graph 311 corresponds to the first item and the right end of the graph 311 corresponds to the 1000th item. The left boundary line 321 of the display range box 320 is displayed at a position corresponding to the 421st item on the graph 311. The right boundary line 322 of the display range box 320 is displayed at a position corresponding to the 450th item on the graph 311. The display range minimum value 341 indicates 4700 yen and the display range maximum value 342 indicates 5190 yen. The reference item of the sort condition and the display item correspond to each other and the sort condition is the ascending order, so that the 4700 yen is the price of the 421st corresponding item for sale and the 5190 yen is the price of the 450th corresponding item for sale.

Figure 5:
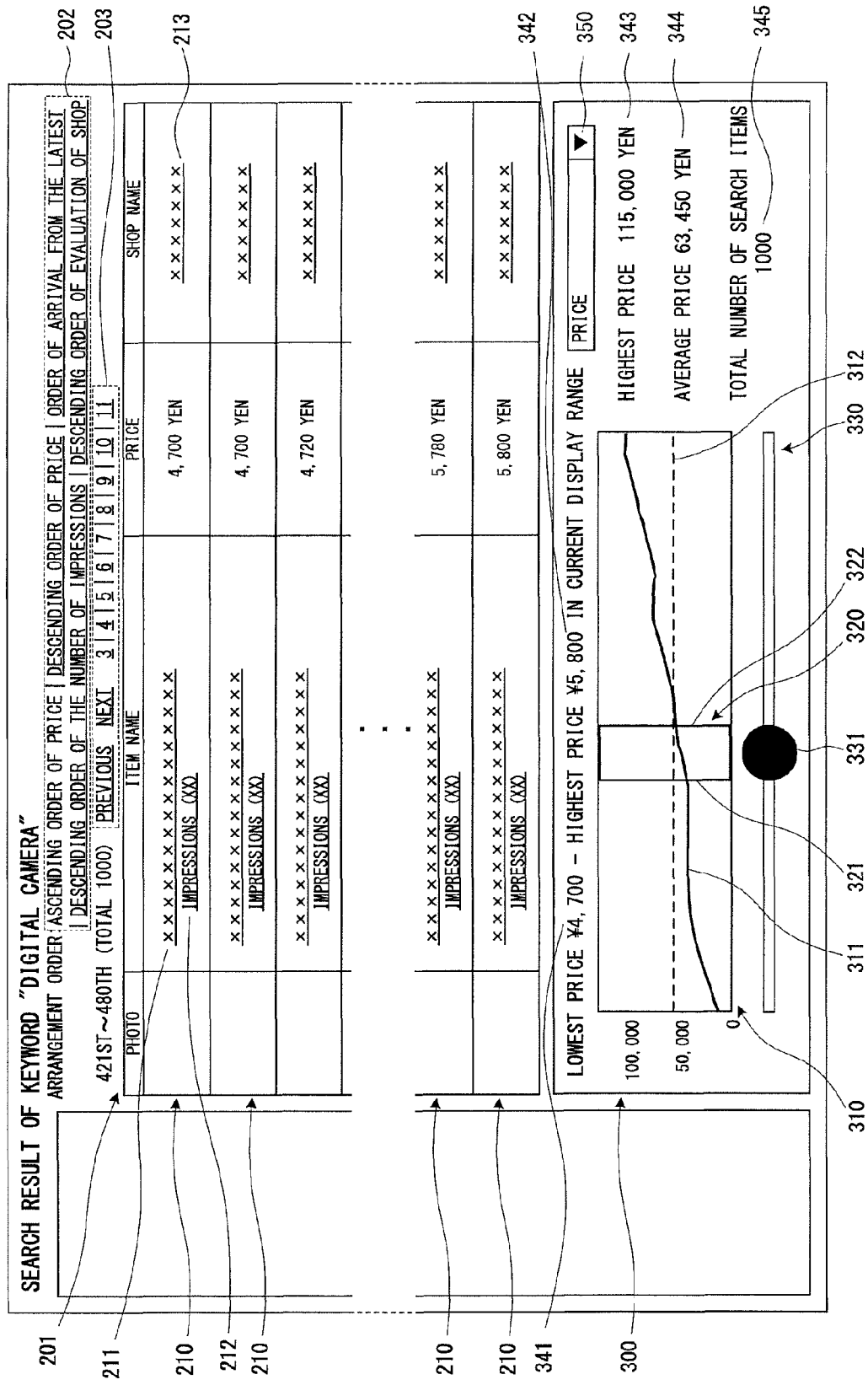
FIG. 5 is a diagram showing a screen display example of a search result page by the user terminal 2.

Here, for example, it is assumed that the user performs an operation to move the right boundary line 322 to the right direction (in other words, in a direction in which the order of the display increases along the horizontal axis of the graph 310). Then, the right boundary line 322 moves to the right and the horizontal width of the display range box 320 increases. As shown in FIG. 5, if the user operation ends when the right boundary line 322 moves to a position corresponding to the 480th item, 60 pieces of one item information 210 of the corresponding items for sale from the 421st item to the 480th item are displayed in the corresponding items-for-sale list 201. The display of the display range maximum value 342 changes to 5800 yen. The 5800 yen is the price of the 480th corresponding item for sale.

Figure 6:
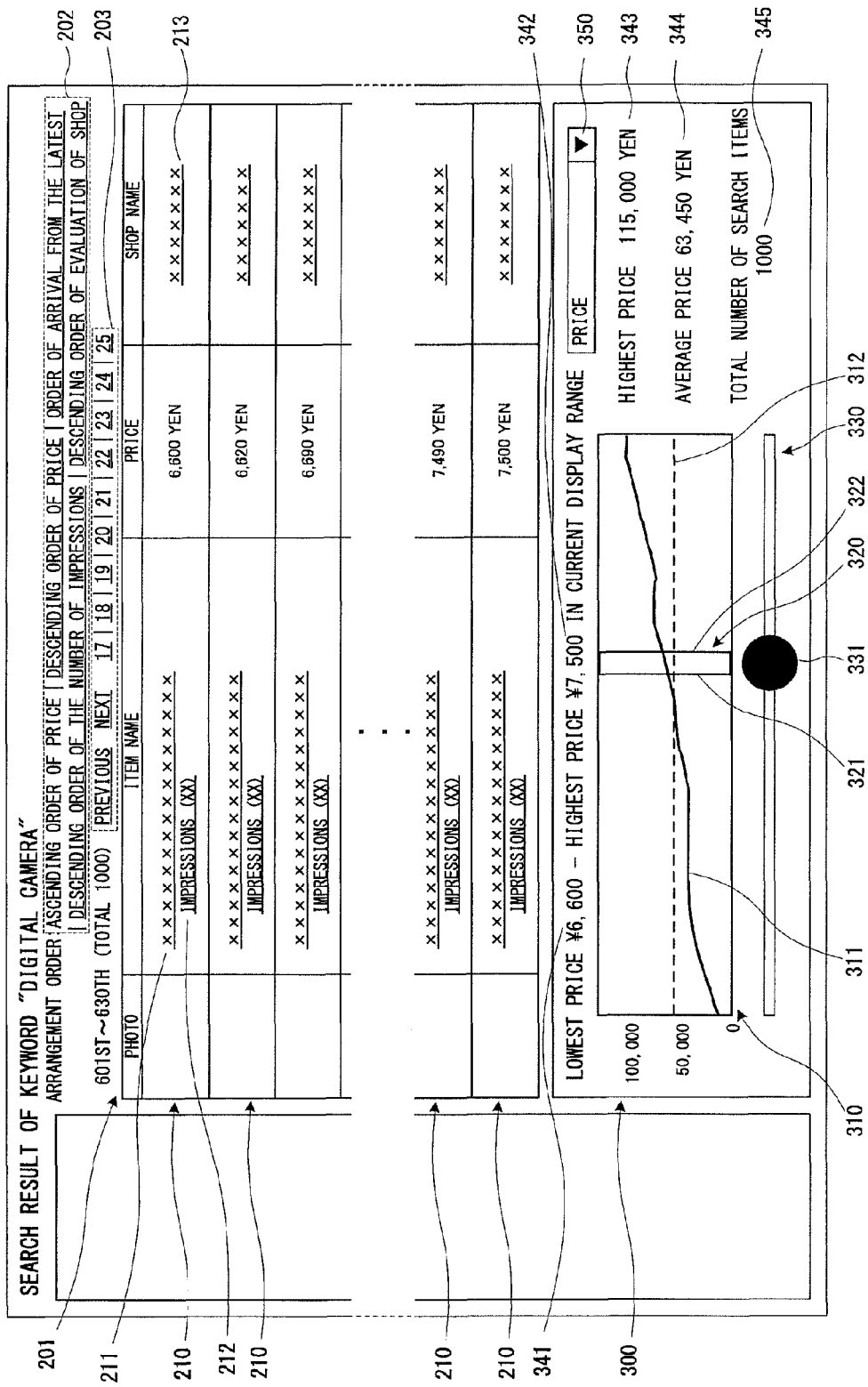
FIG. 6 is a diagram showing a screen display example of a search result page by the user terminal 2.

Further, it is assumed that the user performs an operation to move the knob 331 to the right direction (in other words, in a direction in which the order of the display increases along the horizontal axis of the graph 310) when the search result page shown in FIG. 4 is displayed on a screen. Then, the display range box 320 moves to the right. As shown in FIG. 6, if the user operation ends when the display range box 320 moves to a position at which the left boundary line 321 corresponds to the 601st item, 30 pieces of one item information 210 of the corresponding items for sale from the 601st item to the 630th item are displayed in the corresponding items-for-sale list 201. The display of the display range minimum value 341 changes to 6600 yen. The 6600 yen is the price of the 601st corresponding item for sale. The display of the display range maximum value 342 changes to 7500 yen. The 7500 yen is the price of the 630th corresponding item for sale.

Figure 7:
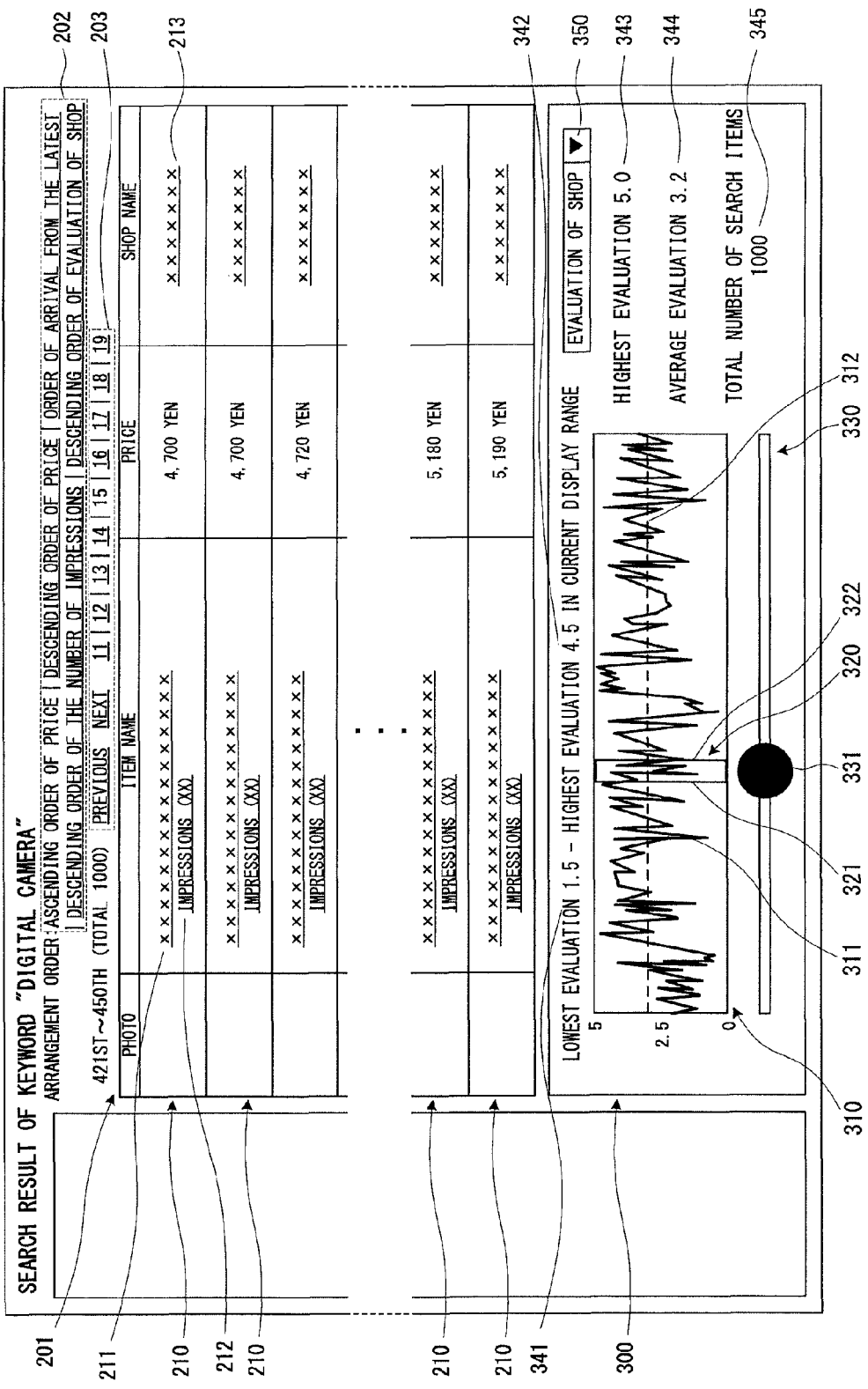
FIG. 7 is a diagram showing a screen display example of a search result page by the user terminal 2.

Further, it is assumed that the user operates the display item selection menu 350 and changes the display item to the evaluation of a shop that sells the item for sale when the search result page shown in FIG. 4 is displayed on the screen. Then, as shown in FIG. 7, the graph 311 changes to a graph that shows a relationship between the priority order of the display of the search result (the order of display) and the evaluation of a shop that sells the item for sale. In other words, the horizontal axis of the graph 310 represents the priority (order) of the display of the search result and the vertical axis represents the evaluation of a shop that sells the item for sale, which is the display item. In this case, the reference item of the sort condition is the price and the display item is the evaluation of a shop that sells the item for sale. Therefore, the reference item of the sort condition and the display item do not correspond to each other, so that basically the graph 311 is not an increasing graph or a decreasing graph, and there are increases and decreases in the graph 311. The display of the display range minimum value 341, the display range maximum value 342, the maximum value 343, and the average value 344 change to display of the evaluation values, respectively.

Next, an example of use of the display item information display area 300 will be described. It is assumed that a user searches for a digital camera in a predetermined price range. In this case, the search condition is set to "digital camera" and the sort condition is set to the ascending order of price. When the search is performed in this condition, in the corresponding items-for-sale list 201, for example, pieces of one item information of the corresponding items for sale from the first item to the 30th item are displayed in ascending order of price. The graph 311 is a monotonically increasing graph showing a relationship between the priority order of the display of the search result and the price. The display range box 320 is displayed corresponding to a position of the first item to the 30th item on the graph 311.

The user can know what price range of the search result is displayed in the entire search result from the graph 311 and the display range box 320. The user can clearly know the price range in which the search result is displayed from the display of the display range minimum value 341 and the display range maximum value 342. The user can grasp the whole picture of the search result from the display of the maximum value 343, the average value 344, and the total number of search items 345.

The user can know what price range is the desired price range in the entire search result from the graph 311 and the display range box 320. Therefore, the user can display the search result of the desired price range by selecting any one of the links of the other search result link group 203. Also, the user can display the search result of the desired price range by moving the knob 331 of the slide bar 330. Basically, when moving the knob 331, the number of operations to display the search result of the desired price range is smaller than when selecting a link of the other search result link group 203. Further, the user can set the price range in which the search result is displayed to the desired price range by moving the left boundary line 321 or the right boundary line 322 of the display range box 320.

Here, in a conventional information display device, the number of display items in one search result page is often set in advance by the system or set by a user. Therefore, when a total number of pieces of information that have been searched for is greater than the number of display items in one search result page, the pieces of information listed in one search result page is apart of all the pieces of information that have been searched for. In this case, if the user wants to browse a list of information other than the currently displayed information, for example, the user has to select a link displayed as "Next". On the other hand, when the user searches for desired information from the search result, the user may have some criteria for the desired information. Examples of items of the criteria include novelty of information, the price of the item for sale, the number of accesses, and an evaluation value. Numerical values of such items may be displayed for information that is currently listed on the search result page. However, in a conventional information display device, it is not known whether or not there is information, where the values of the items of the criteria are within a range desired by the user, other than the information that is currently listed. Therefore, the user cannot determine whether or not the user should browse a list of information other than the information that is currently listed.

Regarding such a problem of the conventional information display device, in the user terminal 2 of the embodiment, it is possible to easily understand what values the entire search result includes with respect to a predetermined condition (display item) and how the entire search result behaves with respect to a predetermined condition (display item) as a whole from the graph 311 and the display range box 320.

5. Operation of Shopping System

Next, an operation of the shopping system S will be described with reference to FIGS. 8 and 9.

FIG. 8 is a flowchart showing a process example of the system control unit 40 of the user terminal 2 according to the embodiment. For example, the process of FIG. 8 is started when a user inputs a search condition and a sort condition and requests to start the search.

First, the system control unit 40 transmits a search request including the inputted search condition and sort condition to the shopping server 1 (step S1). Then, the system control unit 40 receives an HTML document of a search result page transmitted from the shopping server 1 in response to the search request (step S2).

Next, the system control unit 40 analyzes content of the HTML document (step S3). Then, the system control unit 40 displays the search result page on a screen of the display unit 32 according to description of the HTML document. Specifically, the system control unit 40 displays the corresponding items-for-sale list 201, the sort condition link group 202, the other search result link group 203, and the like (step S4). Also, the system control unit 40 displays the maximum value 343, the average value 344, and the total number of search items 345 (step S5). Also, the system control unit 40 displays the display range minimum value 341 and the display range maximum value 342 (step S6).

The system control unit 40 acquires a URL (Uniform Resource Locator) of graph image data from an IMG tag for displaying the graph image data and determines whether or not the graph image data corresponding to the acquired URL is stored in the storage unit 35 as a cache of a web browser sub-program (step S7). At this time, if the graph image data corresponding to the acquired URL is not stored (step S7: NO), the system control unit 40 transmits an image request including the acquired URL to the shopping server 1 (step S8). Then, the system control unit 40 receives graph image data transmitted from the shopping server 1 in response to the image data request and stores the graph image data into the storage unit 15 (step S9).

If the graph image data corresponding to the acquired URL is stored (step S7: YES) or when the system control unit 40 completes the process of step S9, the system control unit 40 displays an image of a graph based on the graph image data corresponding to the acquired URL (step S10). Next, the system control unit 40 displays the display range box 320 and the slide bar 330 (step S11). A display start number, the number of displayed items, and the total number of search items are included in the received HTML document. The system control unit 40 can acquire the display position of the graph image and the number of horizontal pixels of the graph image. The system control unit 40 determines the display position and the horizontal width of the display range box 320 and the display position of the knob 331 on the basis of above information.

Next, the system control unit 40 determines whether or not a user operation is detected on the basis of the instruction signal inputted from the operation unit 31 (step S12). At this time, if the user operation is not detected (step S12: NO), the system control unit 40 performs the determination of step S12 again. On the other hand, if the user operation is detected (step S12: YES), the system control unit 40 determines content of the detected user operation (step S13).

At this time, if the user operation is an operation to select any one of links in the sort condition link group 202 (step S13: sort), the system control unit 40 transmits a sort request including a sort condition corresponding to the selected link to the shopping server 1 (step S14) and proceeds to step S2. Thereafter, the system control unit 40 receives an HTML document transmitted from the shopping server 1 in response to the sort request and re-displays the search result page. In this case, the priority order of the display of the search result is sorted by the sort condition corresponding to the selected link. The display item is changed to the reference item of the sort condition. Therefore, the display content of the display item information display area 300 including the graph 311 changes.

In step S13, if the user operation is a display item selection operation in the display item selection menu 350 (step S13: display item change), the system control unit 40 transmits a display item change request including an item type indicating the selected display item to the shopping server 1 (step S15) and proceeds to step S2. Thereafter, the system control unit 40 receives an HTML document transmitted from the shopping server 1 in response to the display item change request and re-displays the search result page. In this case, information displayed in the display item information display area 300 including the graph 311 changes to information of the selected display item.

In step S13, if the user operation is an operation to select any one of links of the other search result link group 203 (step S13: other result search), the system control unit 40 changes the display start number according to the selected link (step S16). The display start number indicates the priority of the first item for sale of the corresponding items for sale that are listed in the corresponding items-for-sale list 201. Next, the system control unit 40 transmits a display range change request including the changed display start number and the number of currently displayed items to the shopping server 1 (step S17) and proceeds to step S2. Thereafter, the system control unit 40 receives an HTML document transmitted from the shopping server 1 in response to the display range change request and re-displays the search result page. In this case, the range of the corresponding items for sale that are listed in the corresponding items-for-sale list 201 changes according to the selected link. Also, the display position of the display range box 320 moves according to the selected link.

In step S13, if the user operation is an operation to move the knob 331 of the slide bar 330 (step S13: slide bar operation), the system control unit 40 changes the display start number according to the display position of the moved knob 331 (step S18). Next, the system control unit 40 transmits a display range change request including the changed display start number and the number of currently displayed items to the shopping server 1 (step S21).

In step S13, if the user operation is an operation to move the left boundary line 321 of the display range box 320 (step S13: left boundary line operation), the system control unit 40 changes the display start number according to the display position of the moved left boundary line 321 (step S19). Next, the system control unit 40 changes the number of displayed items on the basis of the display position of the moved left boundary line 321 and the display position of the right boundary line 322 (step S20). Next, the system control unit 20 transmits a display range change request including the changed display start number and the changed number of displayed items to the shopping server 1 (step S21).

In step S13, if the user operation is an operation to move the right boundary line 322 of the display range box 320 (step S13: right boundary line operation), the system control unit 40 changes the number of displayed items on the basis of the display position of the left boundary line 321 and the display position of the moved right boundary line 322 (step S20). Next, the system control unit 40 transmits a display range change request including the current display start number and the changed number of displayed items to the shopping server 1 (step S21).

After transmitting the display range change request, the system control unit 40 proceeds to step S2. Thereafter, the system control unit 40 receives an HTML document transmitted from the shopping server 1 in response to the display range change request and re-displays the search result page. In this case, the range of the corresponding items for sale that are listed in the corresponding items-for-sale list 201 changes according to the movement of the knob 331, the left boundary line 321, or the right boundary line 322. Also, the display position and the horizontal width of the display range box 320 change according to the movement of the knob 331, the left boundary line 321, or the right boundary line 322.

In step S13, when the user operation is other than an operation to select any one of links of the sort condition link group 202, an operation to select a display item in the display item selection menu 350, an operation to select any one of links of the other search result link group 203, an operation to move the knob 331 of the slide bar 330, an operation to move the left boundary line 321 of the display range box 320, and an operation to move the right boundary line 322 of the display range box 320 (step S13: other), the system control unit 40 performs processing according to content of the operation (step S22) and proceeds to step S12.

Figure 9:
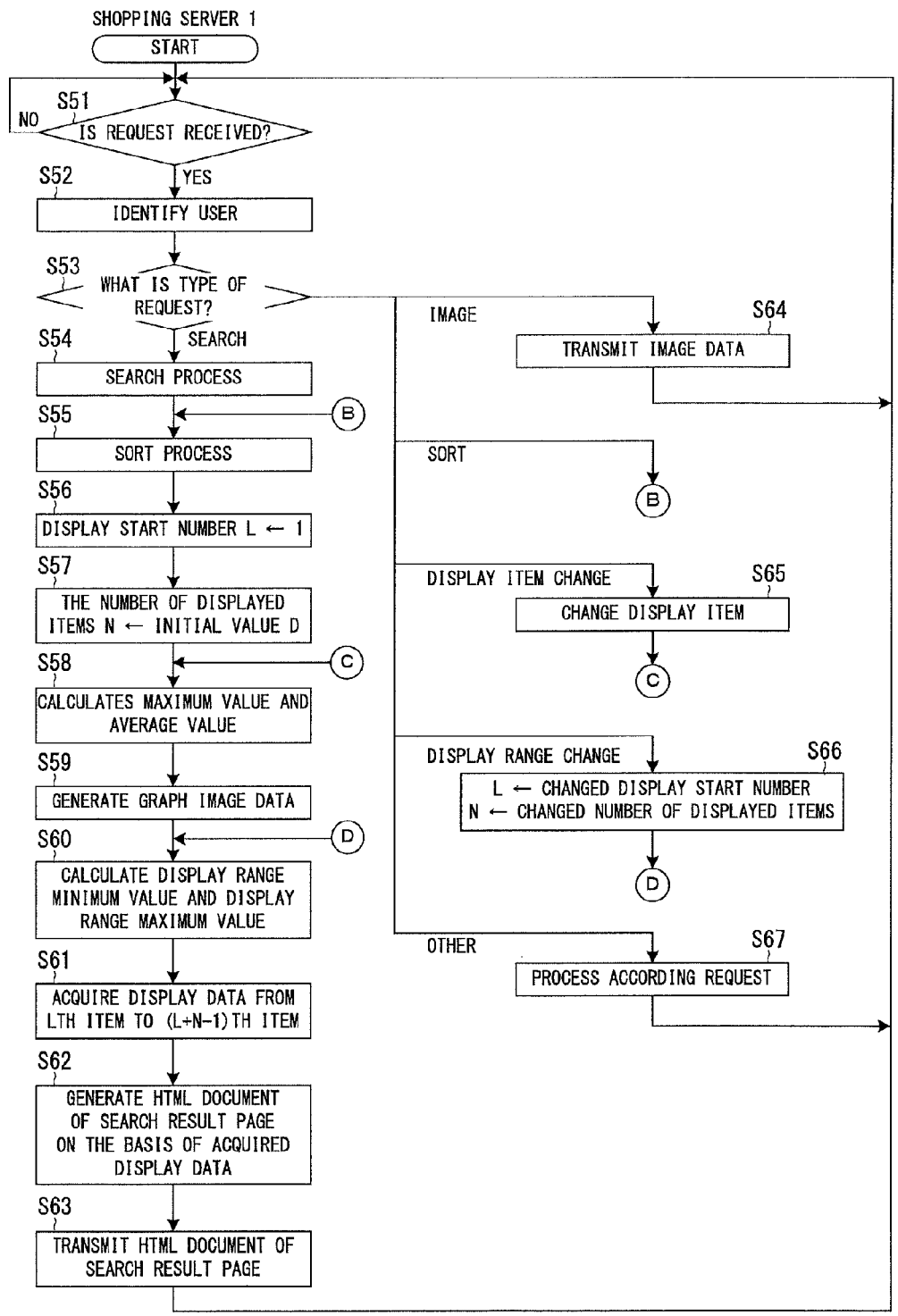
FIG. 9 is a flowchart showing a process example of a system control unit 20 of the shopping server 1 according to the embodiment.

FIG. 9 is a flowchart showing a process example of a system control unit 20 of the shopping server 1 according to the embodiment. For example, the process of FIG. 9 is started when the shopping server 1 is in a waiting state of a request from the user terminal 2.

First, the system control unit 20 determines whether or not a request from the user terminal 2 is received (step S51). At this time, if the request is not received (step S51: NO), the system control unit 20 performs the determination process of step S51 again.

On the other hand, if the request is received from the user terminal 2 (step S51: YES), the system control unit 20 identifies a user of the user terminal 2 that transmits the received request (step S52). For example, the user logs in to the shopping site by operating the user terminal 2 to access the shopping server 1 and inputting member ID and password of the user in advance. The shopping server 1 issues a session ID to the user terminal 2 by the login and manages various information as session information in association with the session ID. The session information includes the member ID. Also, the shopping server 1 transmits the session ID to the user terminal 2 as, for example, a cookie. A request from the user terminal 2 to the shopping server 1 includes the session ID after that, so that the system control unit 20 can identify the user who transmits the request.

When the system control unit 20 completes the process of step S52, the system control unit 20 determines the type of the received request (step S53). At this time, if the received request is a search request (step S53: search), the system control unit 20 performs a search process (step S54). Specifically, the system control unit 20 searches the items-for-sale DB 103 on the basis of a search condition included in the received search request. Next, the system control unit 20 extracts information such as the item-for-sale ID, the price, the start date and time of the sale, and the number of impressions of the items for sale that satisfy the search condition from the items-for-sale DB 103. Then, the system control unit 20 generates a search result list based on the extracted information and stores the search result list in the storage unit 15 in association with the session ID.

When the system control unit 20 completes the process of step S54, the system control unit 20 performs a sort process (step S55). Specifically, the system control unit 20 sorts information included in the search result list by the sort condition included in the received search request. In other words, the system control unit 20 sorts the priority order of the display of the corresponding items for sale in order indicated by the sort condition.

When the system control unit 20 completes the sort process, the system control unit 20 initializes variables included in the session information of the identified user. Specifically, the system control unit 20 sets a display start number L to 1 (step S56). Further, the system control unit 20 sets the number of displayed items N to an initial value D of the number of displayed items (step S57).

When the system control unit 20 completes the process of step S57, the system control unit 20 calculates the maximum value 343 and the average value 344 to be displayed in the search result page. Specifically, the system control unit 20 sets the display item to the reference item of the sort condition included in the received search request. Next, the system control unit 20 extracts data corresponding to the set display item from the search result list for all the corresponding items for sale. Next, the system control unit 20 generates a display item value list which is a list of the extracted data corresponding to the display item. Then, the system control unit 20 calculates the maximum value 343 and the average value 344 on the basis of the data corresponding to the display item included in the display item value list.

When the system control unit 20 completes the process of step S58, the system control unit 20 generates graph image data on the basis of the data corresponding to the display item included in the display item value list (step S59). The data used to generate the graph image data may be a part of the data instead of the data for all the items for sale. For example, when the total number of search items is greater than the number of horizontal pixels of the graph 311, it is meaningless to generate the graph image data using data of all the items for sale that have been searched for. In this case, the system control unit 20 may generate the graph image data by moderately extracting necessary data from the display item value list. When generating the graph image data, the system control unit 20 assigns a new URL to the graph image data. Then, the system control unit 20 stores the generated graph image data in the storage unit 15 in association with the new URL.

When the system control unit 20 completes the process of step S59, the system control unit 20 calculates the display range minimum value 341 and the display range maximum value 342 (step S60). Specifically, the system control unit 20 calculates the display range minimum value 341 and the display range maximum value 342 on the basis of the data corresponding to the display item of the corresponding items for sale from the Lth item to the (L+N−1)th item according to the priority order of the display among the data corresponding to the display item included in the display item value list.

When the system control unit 20 completes the process of step S60, the system control unit 20 acquires list display data of the items for sale from the Lth item to the (L+N−1)th item according to the priority order of the display on the basis of the item-for-sale ID included in the search result list from the shop DB 102 and the items-for-sale DB 103 (step S61). The list display data of the items for sale is information displayed in the corresponding items-for-sale list 201 of the search result page, specifically, image, item-for-sale name, price, shop name, and the like.

Next, the system control unit 20 generates an HTML document of the search result page on the basis of the acquired list display data and the like (step S62). At this time, the system control unit 20 inserts the information calculated in steps S58 and S60 into the HTML document. Also, the system control unit 20 inserts the display start number L and the number of displayed items N into the HTML document. The display start number L and the number of displayed items N are an example of information that indicates the display range of the present invention and the total number of search items 345, the display start number L, and the number of displayed items N are an example of range indication display information. The system control unit 20 sets an SRC attribute of the IMG tag for displaying graph to the URL assigned to the graph image data in step S59. Next, the system control unit 20 transmits the generated HTML document of the search result page to the user terminal 2 that has transmitted the request (step S63). After completing this process, the system control unit 20 proceeds to step S51.

In step S53, if the received request is the image data request (step S53: image), the system control unit 20 reads image data corresponding to the URL included in the image data request from the storage unit 15 and transmits the read image data to the user terminal 2 that has transmitted the request (step S64). After completing this process, the system control unit 20 proceeds to step S51.

In step S53, if the received request is the sort request (step S53: sort), the system control unit 20 performs a sort process according to the sort condition included in the sort request (step S55). Thereafter, the system control unit 20 generates graph image data and an HTML document on the basis of a search result list in which information of the items for sale is sorted by new sort condition and transmits the generated HTML document to the user terminal 2 that has transmitted the request.

In step S53, if the received request is the display item change request (step S53: display item change), the system control unit 20 sets a display item indicated by the type included in the display item change request as a new display item (step S65). Then, the system control unit 20 calculates the maximum value 343 and the average value 344 by the new display item (step S58). Next, the system control unit 20 generates graph image data by the new display item (step S59). Thereafter, the system control unit 20 generates an HTML document and transmits the generated HTML document to the user terminal 2 that has transmitted the request.

In step S53, if the received request is the display range change request (step S53: display range change), the system control unit 20 sets the display start number L to the display start number included in the display range change request and sets the number of displayed items N to the number of displayed items included in the display range change request (step S66). Then, the system control unit 20 proceeds to step S60, generates an HTML document corresponding to a changed display range corresponding to the set display start number L and the set number of displayed items N and transmits the generated HTML document to the user terminal 2 that has transmitted the request. In this case, the display item is not changed, so that the system control unit 20 does not newly generate graph image data. Therefore, when the system control unit 20 generates the HTML document, the system control unit 20 sets the SRC attribute of the IMG tag for displaying graph to the URL assigned when the graph image data is generated.

In step S53, if the received request is other than the search request, the sort request, the display item change request, and the display range change request (step S53: other), the system control unit 20 performs processing according to the received request (step S67) and proceeds to step S51.

As described above, according to the embodiment, the system control unit 20 of the shopping server 1 transmits the HTML document which displays the corresponding items-for-sale list 201 that shows one or more items for sale of the items for sale that have been searched for and which also displays the display range box 320 that indicates the display range, which is the range of the items for sale shown in the displayed corresponding items-for-sale list 201, by a display position in the graph 311. Also, the system control unit 20 generates graph image data based on values of the display item corresponding to the items for sale that have been searched for and transmits graph image data for displaying the graph 311 that shows a graph indicating a relationship between the priority order, in which the items for sale that have been searched for are displayed as the search result, and the display item to the user terminal 2.

The user terminal 2 displays the corresponding items-for-sale list 201 and the display range box 320 on the basis of the HTML document received from the shopping server 1 and displays the graph 311 on the basis of the graph image data received from the shopping server 1.

Therefore, a user can easily know the range in which the search result is currently displayed from the display position of the display range box 320 in the graph 311. Also, the user can easily know whether or not information where the value of the display item is within a desired range is present outside the range in which the search result is currently displayed from the graph 311 and the display range box 320. Therefore, the user can easily determine whether or not the user should browse the search result of items for sale other than the items for sale that are currently displayed as the search result. Further, it is possible to reduce a processing load of the user terminal 2 when displaying the graph 311.

The system control unit 20 of the shopping server 1 transmits graph image data representing the graph 311 that shows a relationship between the priority order of the display of the entire search result and the display item to the user terminal 2. Then, the system control unit 40 of the user terminal 2 displays the graph 311 that shows a relationship between the priority order of the display of the entire search result and the display item.

Therefore, the user can easily know where the range in which the search result is currently displayed occupies in the entire search result.

When the system control unit 40 of the user terminal 2 detects a change operation, the system control unit 40 changes the display range of the search result and changes at least one of the display position and the horizontal width of the display range box 320.

Therefore, it is possible to display a search result of a range that the user desires.

The system control unit 40 transmits an HTML document which displays the slide bar 330 including the knob 331 as a graphical user interface to the user terminal 2.

When the system control unit 40 of the user terminal 2 displays the knob 331 that can be operated and moved in a direction of the priority order of the display in the graph 311 and detects an operation to move the knob 331, the system control unit 40 moves the display range of the search result and moves the display position of the display range box 320 corresponding to moving distance of the knob 331.

Therefore, when the user operates and moves the knob 331, it is possible to display the search result in a range that the user desires.

The display range box 320 includes the left boundary line 321 and the right boundary line 322, and the system control unit 40 of the user terminal 2 displays the left boundary line 321 at a position corresponding to the head of the display range of the search result on the graph and the right boundary line 322 at a position corresponding to the tail of the display range of the search result on the graph. When the system control unit 40 detects an operation to move either one of the left boundary line 321 and the right boundary line 322, the system control unit 40 changes the number of displayed items of the search result corresponding to the movement of the left boundary line 321 or the right boundary line 322.

Therefore, when the user operates and moves the left boundary line 321 or the right boundary line 322, the user can easily match the display range of the search result to a range that the user desires.

The system control unit 40 of the user terminal 2 displays the display range minimum value 341 and the display range maximum value 342.

Therefore, the user can easily know the range of the display item in the range of the currently displayed search result.

The system control unit 40 of the user terminal 2 displays the maximum value 343, the average value 344, and the total number of search items 345.

Therefore, the user can easily grasp the whole picture of the search result.

The system control unit 40 of the user terminal 2 displays the graph 311 of the display item which is selected from the display item selection menu 350 by an operation of the operation unit 31.

Therefore, it is possible to display a search result of a display item that the user desires.

The system control unit 20 of the shopping server 1 causes the display item whose graph 311 is displayed to correspond to the reference item of the sort condition, generates graph image data, and transmits the generated graph image data to the user terminal 2.

Therefore, an increasing graph 311 or a decreasing graph 311 is displayed, so that the user can easily know where the range, in which information where the value of the display item is within a desired range, is located in the search result.

6. MODIFIED EXAMPLE

6.1 Modified Example 1

In the embodiment described above, In order to display the graph 311 in the search result page, the shopping server 1 generates graph image data and transmits the graph image data to the user terminal 2, and the user terminal 2 displays the image of the graph. However, the user terminal 2 may draw the graph 311 on the basis of data of the display item.

Specifically, for example, Adobe Flash (trademark) is used. In this case, the storage unit 15 of the shopping server 1 stores an SWF file to display the display item information display area 300. The SWF file is a file generated using the Adobe Flash (trademark). When the SWF file is reproduced by using a dedicated reproduction program, display of the display item information display area 300 is performed. The dedicated reproduction program is stored in the storage unit 35 of the user terminal 2. The reproduction program is included in the web browser program as an add-on.

The shopping server 1 inserts a tag indicating that the SWF file should be reproduced into an HTML document of the search result page and transmits the HTML document to the user terminal 2.

The user terminal 2 analyzes the received HTML document and downloads the SWF file from the shopping server 1. The downloaded SWF file is stored in the storage unit 35 as a cache of the web browser. Therefore, the user terminal 2 need not download the same SWF file more than once.

The user terminal 2 reproduces the SWF file by the add-on reproduction program. Then, the user terminal 2 receives a display item value list from the shopping server 1.

The user terminal 2 draws the graph 311 in the graph area 310 on the basis of the received display item value list. Also, the user terminal 2 displays the display range minimum value 341, the display range maximum value 342, the maximum value 343, the average value 344, the total number of search items 345, and the like on the basis of the received display item value list. Further, the system control unit 20 displays the display range box 320 and the slide bar 330.

When the shopping server 1 transmits the display item value list to the user terminal 2, the shopping server 1 need not include data of all the items for sale that have been searched for in the display item value list. For example, when the total number of search items is greater than the number of horizontal pixels of the graph 311, it is meaningless to generate graph image data using data of all the items for sale that have been searched for. The shopping server 1 may appropriately thin out data of the display item value list and transmit the display item value list to the user terminal 2. In this case, the shopping server 1 may calculate the maximum value 343, the average value 344, and the total number of search items 345, add these parts of information to the display item value list, and transmit the display item value list to the user terminal 2. Thereby, the user terminal 2 can display the maximum value 343, the average value 344, and the total number of search items 345 even when the display item value list does not include data to calculate the parts. Alternatively, the shopping server 1 may insert the parts into the HTML document of the search result page.

When the sort condition is changed by a user operation, the user terminal 2 receives an HTML document and re-displays the search result page. At this time, the user terminal 2 receives display item data (an example of graph display information) corresponding to a display item matching the reference item of the changed sort condition from the shopping server 1. Then, the user terminal 2 displays the display item information display area 300 based on the new display item data.

When the display item is changed by a user operation, the user terminal 2 receives display item data corresponding to the changed display item data from the shopping server 1. Then, the user terminal 2 re-displays the display item information display area 300 based on the new display item data. In this case, the display content of the corresponding items-for-sale list 201 need not be changed, so that it is not necessary to receive an HTML document again.

When the display range is changed by a user operation, the user terminal 2 re-displays the search result page. However, in this case, the user terminal 2 can display the display item information display area 300 based on the display item data that has already been received.

As described above, there is a case in which the user terminal 2 only has to receive either one of the HTML document of the search result and the display item data, so that it is possible to reduce a processing load of the shopping server 1. Also, it is possible to reduce a network load for transmitting and receiving data. Since the user terminal 2 displays the graph 311 on the basis of the display item data, the shopping server 1 need not generate the graph image data.

For example an RIA (Rich Internet Application) other than the Adobe Flash (trademark) may be used to display the display item information display area 300. Examples of the RIA include Silverlight (trademark) and Ajax.

6.2 Modified Example 2

In the embodiment described above, the graph 311 is displayed for one display item. However, the graphs 311 may be displayed at the same time for two or more display items.

Figure 10:
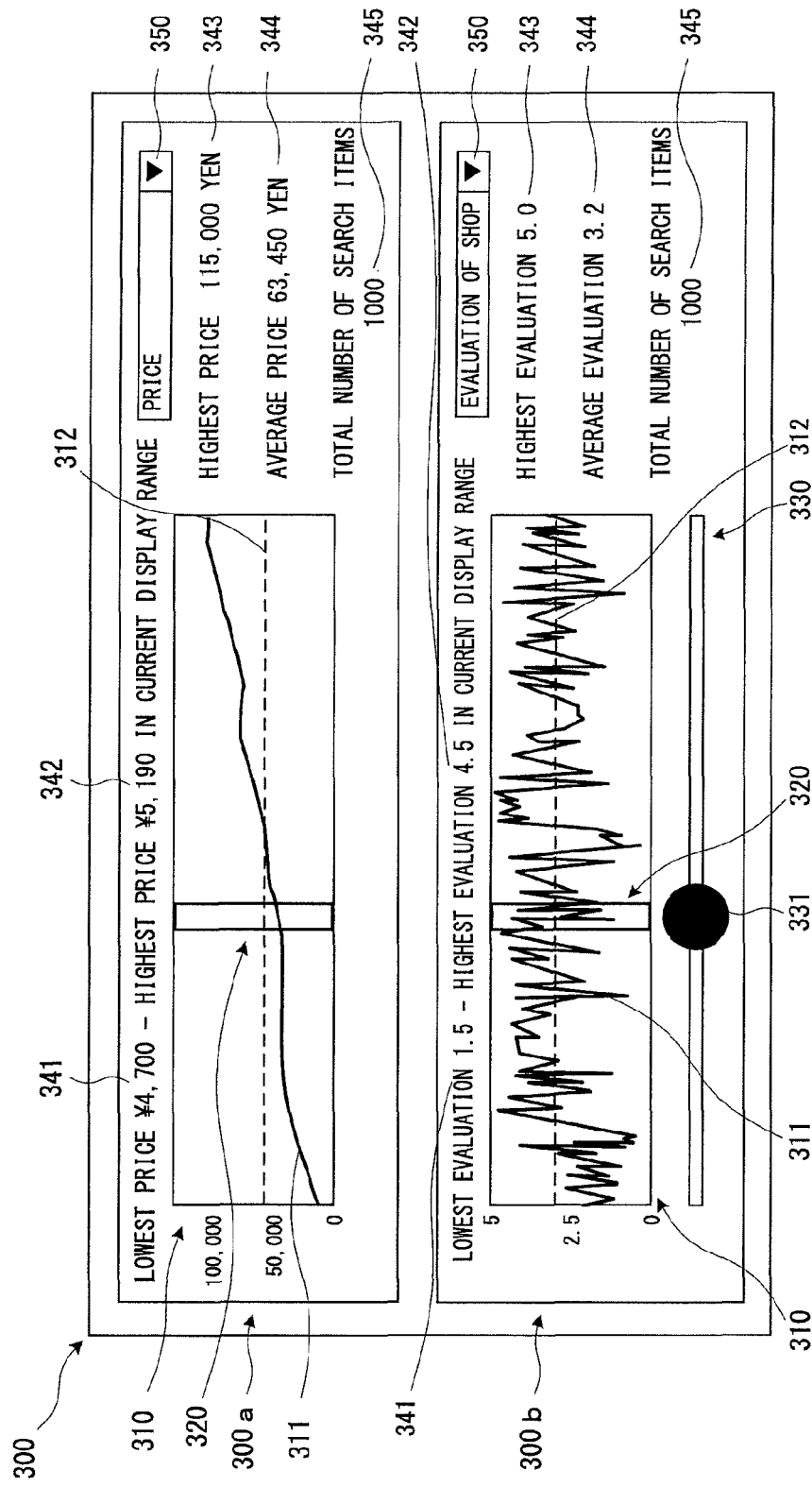
FIG. 10 is a display example of a display item information display area 300 when two graphs 311 are displayed in one search page.

FIG. 10 is a display example of the display item information display area 300 when two graphs 311 are displayed in one page of the search page.

As shown in FIG. 10, a display item information display area 300*a*, a display item information display area 300*b*, and the slide bar 330 are displayed in the display item information display area 300. In each of the display item information display areas 300*a* and 300*b*, the graph area 310, the display range box 320, the display range minimum value 341, the display range maximum value 342, the maximum value 343, the average value 344, the total number of search items 345, and the display item selection menu 350 are displayed. In the example of FIG. 10, the display item of the display item information display area 300*a* is the price of the item for sale and the display item of the display item information display area 300*b* is the evaluation of a shop that sells the item for sale. The display items of the display item information display areas 300*a* and 300*b* can be changed individually.

The display positions and the horizontal widths of the display range boxes 320 of the display item information display areas 300*a* and 300*b* are the same. When the knob 331 of the slide bar 330 is moved, the display range boxes 320 of the display item information display areas 300*a* and 300*b* are moved in conjunction with each other. Also, when the left boundary line 321 or the right boundary line 322 of the display range box 320 of one of the display item information display areas 300*a* and 300*b* is moved, the left boundary line 321 or the right boundary line 322 of the display range box 320 of the other display item information display area is also moved.

Only the display item information display area 300*a* of the display item information display areas 300*a* and 300*b* may be displayed by default, and when a user performs an operation to add a display item, the display item information display area 300*b* may be further displayed.

An example of use of the display item information display area 300 will be described. It is assumed that a user searches for a digital camera where the evaluation value of a shop that sells the digital camera is greater than or equal to a predetermined value in a predetermined price range. As shown in FIG. 10, the user can know where the range of the items for sale in a desired price range is located in the entire search result from the graph 311 displayed in the display item information display area 300*a*. Further, the user can know where the desired evaluation values are located in the range of the items for sale in the desired price range from the graph 311 displayed in the display item information display area 300*b*.

Three or more graphs may be displayed in the display item information display area of the search page.

6.3 Modified Example 3

In the embodiment described above, the display range of the search result is indicated by the display range box 320 having a rectangular shape. However, the range indication information that indicates the display range of the search result is not limited to having a rectangular shape.

Figure 11A:
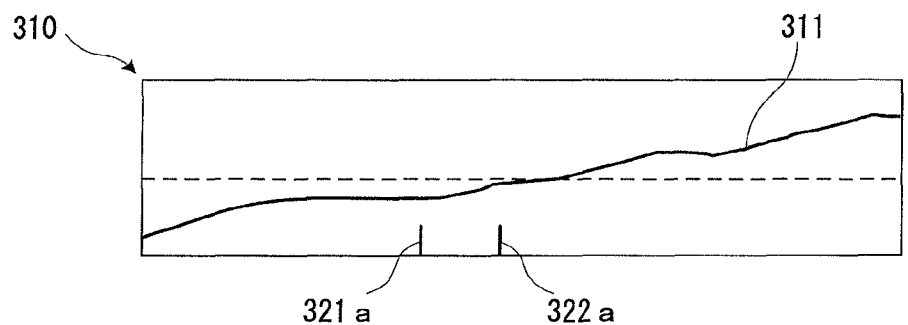
FIGS. 11A to 11C are display examples of range indication information that indicates a display range.
Figure 11B:
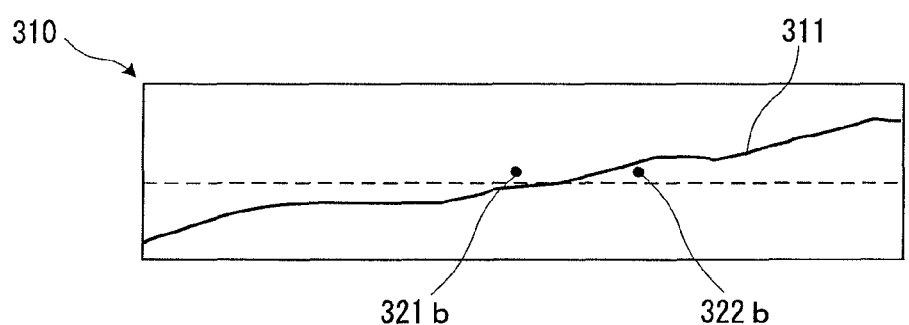
Figure 11C:
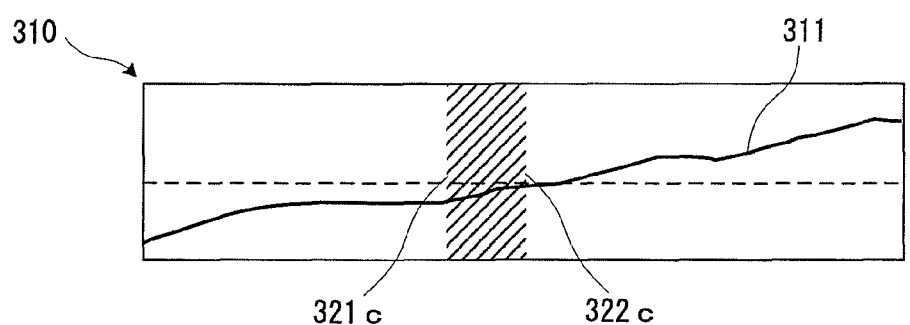

FIGS. 11A to 11C are display examples of the range indication information that indicates the display range.

For example, as shown in FIG. 11A, the left boundary line 321*a* (an example of a head part) and the right boundary line 322*a* (an example of a tail part) may form the range indication information. The left boundary line 321*a* and the right boundary line 322*a* are vertical straight lines. In FIG. 11A, the left boundary line 321*a* and the right boundary line 322*a* are displayed in a lower part of the graph area 310. However, the display position is not limited to the lower part of the graph area 310 but may be on the average value line 312. Alternatively, the left boundary line 321*a* and the right boundary line 322*a* may extend in the vertical direction of the graph area 310 to the same length as the vertical axis of the graph area 310.

As shown in FIG. 11B, the left boundary point 321*b* (an example of the head part) and the right boundary point 322*b* (an example of the tail part) may form the range indication information. In FIG. 11B, the left boundary point 321*b* and the right boundary point 322*b* have a point shape or a circular shape. However the shape is not limited to these shapes, but may be, for example, a rectangular shape or a triangular shape. The left boundary point 321*b* and the right boundary point 322*b* are displayed inside the graph area 310.

As shown in FIG. 11C, in the graph area 310, color of the area corresponding to the display range of the search result may be different from color of the other areas. In FIG. 11C, the color of the area corresponding to the display range is represented by a shaded area for convenience. In this case, the boundaries of the color are the left boundary line 321*c* and the right boundary line 322*c*. Alternatively, in the graph area 310, an image of the area corresponding to the display range of the search result may be different from images of the other areas.

6.4 Other Modified Examples and the Like

In the embodiment described above, the graph 311 of all the items for sale that have been searched for, that is, the graph 311 of the entire search result, is displayed. However, as long as the display range of the search result is included, the graph 311 may be displayed for a partial range of the entire search result. In this case, for example, immediately after the search is performed, the graph 311 is displayed for the first priority item for sale to an item for sale having a predetermined priority. Thereafter, when the display range of the search result is changed, the range where the graph 311 is displayed may be moved or enlarged.

In the embodiment described above, when the search is performed or the sort condition is changed, the display item is matched to the reference item of the sort condition. However, even in this case, the display item need not be matched to the reference item of the sort condition. When inputting the sort condition, the user may select the display item independently from the sort condition.

In the embodiment described above, the knob 331 of the slide bar 330 is applied as an operation part to move the display range of the search result. However, it is not limited to the knob 331, but anything that moves in a direction of the priority of the search result (the horizontal direction in FIG. 4 of the embodiment) may be applied. Also, the display range box 320 may be applied as the operation part. In this case, the display range of the search result may be changed according to a moving operation of the display range box 320 performed by user's dragging of the display range box 320.

The display of the operation part is not essential (however, except for the display range box 320 which is the range indication information). Also, the function that enables the drag operation of the left boundary line 321 and the right boundary line 322 of the display range box 320 is not essential. The reason is because the display range of the search result can be changed by the selection operation of a link of the other search result link group 203. For example, the user may input numerical values to set a display range from the first display item to the last display item, and the display range of the search result may be changed based on the inputted numerical values.

The display of the display range minimum value 341, the display range maximum value 342, the maximum value 343, and the average value 344, the total number of search items 345, and the display item selection menu 350 is not essential.

The display item is not limited to only the price, the updated date and time, the number of postings, and the evaluation value. For example, the number of accesses may be the display item.

The graph area 311 is not limited to a line graph, but may be, for example, a scatter diagram.

In the embodiment described above, the information search device of the present invention is applied to the server device which searches for information of items for sale and transmits the search result to the user terminal. However, the information search device of the present invention may be applied to a device which searches for information other than information of items for sale. For example, when the information search device of the present invention is applied to a search engine or the like, the information that is searched for is, for example, Web page, image data, news article, and the like.

An example of use of a system when news articles are searched for will be described. For example, it is assumed that a user searches for news related to President XX in a predetermined period of time. In this case, the search condition is set to "president XX", the sort condition is set to a chronological order of the news articles, and the display item is set to a registered date of the news article. When the search is performed in this condition, a graph showing a relationship between the priority order in which the news articles that have been searched for are displayed as the search result and the registered date of the news article is displayed. The user sees the displayed graph and displays the search result of the news articles registered in a desired period of time.

REFERENCE SIGNS LIST

1 Shopping server
2 User terminal
11 Operation unit
12 Display unit
13 Communication unit
14 Drive unit
15 Storage unit
16 Input/output interface unit
17 CPU
18 ROM
19 RAM 20 System control unit
21 System bus
31 Operation unit
32 Display unit
33 Communication unit
34 Drive unit
35 Storage unit
36 Input/output interface unit
37 CPU
38 ROM
39 RAM
40 System control unit
41 System bus
101 Member DB
102 Shop DB
103 Items-for-sale DB
104 Member use DB
NW Network
S Shopping system

The invention claimed is:

1. An information providing device for transmitting a search result, which is a result of a search by an information search device and which is displayed by a terminal device, to the terminal device through a network according to a request from the terminal device, the information providing device comprising:
at least one memory to store program code;
at least one processor to access said memory and read said program code and operate as instructed by said program code, said program code including:
search result information transmission code configured to cause at least one of said at least one processor to transmit search result information, which indicates a part of pieces of information that has been searched for by the information search device, to the terminal device;
graph display information transmission code configured to cause at least one of said at least one processor to transmit graph display information for displaying a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and
range indication display information transmission code configured to cause at least one of said at least one processor to transmit range indication display information for displaying predetermined range indication information at a position in the graph, the position indicating a display range being a range of the information indicated by the search result information.

2. The information providing device according to claim 1, wherein
the search result information transmission code is further configured to cause at least one of said at least one processor to transmit the search result information indicating the part of pieces of the information, which has been searched for by the information search device, in the display order according to a sort condition of the information, and
the graph display information transmission code is further configured to cause at least one of said at least one processor to transmit the graph display information for displaying the graph showing the relationship between the display order according to the sort condition and a value of an item which a reference of sorting is set to by the sort condition.

3. The information providing device according to claim 1, wherein said program code further includes:
storage code configured to cause at least one of said at least one processor to store values of the presentation item in association with respective pieces of the information; and
image data generation code configured to cause at least one of said at least one processor to generate image data which represents the graph on the basis of the values corresponding to the information that has been searched for by the information search device as the graph display information,
wherein the graph display information transmission code is further configured to cause at least one of said at least one processor to transmit the generated image data generated to the terminal device.

4. The information providing device according to claim 1, wherein
the search result information transmission code is further configured to cause at least one of said at least one processor to transmit page data that defines display content of a Web page displaying the search result information, the graph, and the range indication information to the terminal device.

5. The information providing device according to claim 4, wherein
the search result information transmission code is further configured to cause at least one of said at least one processor transmit the page data that displays an operation piece for operating and changing the display range by a graphical user interface to the terminal device.

6. The information providing device according to claim 1, wherein
the range indication display information includes information indicating the display range.

7. The information providing device according to claim 1, wherein
the search result information indicates the part of pieces of information that has been searched for by the information search device and arranged in a predetermined display order, and
display position of the range indication information corresponds to a range from a position of a first piece to a position of a last piece of the part of pieces of information indicated by the search result information, from among all pieces of information that have been searched.

8. An information providing method for transmitting a search result, which is a result of a search by an information search device and which is displayed by a terminal device, to the terminal device through a network according to a request from the terminal device, the information providing method comprising:
transmitting search result information, which indicates a part of pieces of information of information that has been searched for by the information search device, to the terminal device;
transmitting graph display information for displaying a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and transmitting range indication display information for displaying predetermined range indication information at a position in the graph, the position indicating a display range being a range of the information indicated by the search result information.

9. A non-transitory recording medium in which an information providing program is computer-readably recorded, the information providing program causing a computer, which is included in an information providing device for transmitting a search result, which is a result of a search by an information search device and which is displayed by a terminal device, to the terminal device through a network according to a request from the terminal device, to function as:

a search result information transmission unit that transmits search result information, which indicates a part of pieces of information of information that has been searched for by the information search device, to the terminal device;

a graph display information transmission unit that transmits graph display information for displaying a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and a range indication display information transmission unit that transmits range indication display information for displaying predetermined range indication information at a position in the graph, the position indicating a display range being a range of the information indicated by the search result information.

10. An information display device for displaying a search result which is a result of a search by an information search device, the information display device comprising:

at least one memory to store program code;

at least one processor to access said memory and read said program code and operate as instructed by said program code, said program code including:

search result display code configured to cause at least one of said at least one processor to display search result information, which indicates a part of pieces of information that has been searched for by the information search device;

graph display code configured to cause at least one of said at least one processor to display a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and range indication information display code configured to cause at least one of said at least one processor to display range indication information on the graph, the range indication information indicating a display range by its display position, the display range being a range of the information indicated by the search result information displayed by the search result display unit.

11. The information display device according to claim 10, wherein the search result display code is further configured to cause at least one of said at least one processor to display the search result information indicating the part of pieces of the information of the information, which has been searched for by the information search device, in the display order according to a sort condition of the information, and the graph display code is further configured to cause at least one of said at least one processor to display the graph showing the relationship between the display order according to the sort condition and a value of an item which a reference of sorting is set to by the sort condition.

12. The information display device according to claim 10, wherein said program code further includes:

change operation detection code configured to cause at least one of said at least one processor to detects a change operation of the display range, wherein when the change operation is detected, the search result display code is further configured to cause at least one of said at least one processor to change the display range and the range indication information display code is further configured to cause at least one of said at least one processor to change at least one of the display position and a shape of the range indication information on the basis of the display range that has been changed.

13. The information display device according to claim 12, wherein said program code further includes:

operation part display code configured to cause at least one of said at least one processor to display an operation part which can be operated and moved in a direction of the display order in the graph, wherein when an operation to move the operation part is detected, the search result display code is further configured to cause at least one of said at least one processor to move the display range according to a moving distance of the operation part and the range indication information display code is further configured to cause at least one of said at least one processor move the display position of the range indication information on the basis of the display range that has been moved.

14. The information display device according to claim 12, wherein the range indication information includes a head part indicating a head of the display range and a tail part indicating a tail of the display range, the range indication display information display code is further configured to cause at least one of said at least one processor to display the head part at a position corresponding to the head of the display range on the graph and displays the tail part at a position corresponding to the tail of the display range on the graph, and wherein when an operation to move one of the head part and the tail part is detected, the search result display code is further configured to cause at least one of said at least one processor to change the number of pieces of the information included in the display range corresponding to the detected move of the head part and/or the tail part.

15. The information display device according to claim 10, wherein said program code further includes:
   first value display code configured to cause at least one of said at least one processor to display a minimum value and a maximum value of the presentation item in the information included in the display range.

16. The information display device according to claim 10, wherein said program code further includes:
   second value display code configured to cause at least one of said at least one processor to display at least one of a maximum value and an average value of the presentation item in a range of all pieces of the information that has been searched for by the information search device and the number of pieces of the information that has been searched for by the information search device.

17. The information display device according to claim 10, wherein said program code further includes:
   selection code configured to cause at least one of said at least one processor to select the presentation item to be displayed from a plurality of presentation items,
   wherein the graph display code is further configured to cause at least one of said at east one processor to display the graph of the selected presentation item.

18. The information display device according to claim 10, wherein
   the search result information indicates the part of pieces of information that has been searched for by the information search device and arranged in a predetermined display order, and
   display position of the range indication information corresponds to a range from a position of a first piece to a position of a last piece of the part of pieces of information indicated by the search result information, from among all pieces of information that have been searched.

19. An information display method for displaying a search result which is a result of a search by an information search device, the information display method comprising:
   displaying search result information, which indicates a part of pieces of information of information that has been searched for by the information search device;
   displaying a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and
   display step of displaying range indication information on the graph, the range indication information indicating a display range by its display position, the display range being a range of the information indicated by the search result information that is displayed.

20. A non-transitory recording medium in which an information display program is recorded, the information display program causing a computer, which is included in an information display device for displaying a search result which is a result of a search by an information search device, to function as:
   a search result display unit that displays search result information, which indicates a part of pieces of information of information that has been searched for by the information search device;
   a graph display unit that displays a graph, concurrently with the search result information, showing a relationship between display order in which the information that has been searched for by the information search device is displayed as the search result and a value of a predetermined presentation item related to the information, the graph showing the relationship concerning all pieces of the information that has been searched for by the information search device, the graph being a graph in which the display order is indicated by a horizontal axis and the value of the presentation item is indicated by a vertical axis; and
   a range indication information display unit that displays range indication information on the graph, the range indication information indicating a display range by its display position, the display range being a range of the information indicated by the search result information displayed by the search result display unit.

21. An information search system comprising:
   a terminal device; and
   an information search device that searches for information according to a request from the terminal device and transmits a search result to the terminal device through a network,
   wherein the information search device includes
   a search result reception unit that receives a search condition transmitted from the terminal device,
   a search unit that searches for the information which satisfies the search condition,
   a search result information transmission unit that transmits search result information, which indicates a part of pieces of the information of the information that has been searched for by the search unit, to the terminal device,
   a graph display information transmission unit that transmits graph display information for displaying a graph, concurrently with the search result information, showing a relationship between display order in which the information that has been searched for by the search unit is displayed as the search result and a value of a predetermined presentation item related to the information, the graph showing the relationship concerning all pieces of the information that has been searched for by the search unit, the graph being a graph in which the display order is indicated by a horizontal axis and the value of the presentation item is indicated by a vertical axis, and
   a range indication display information transmission unit that transmits range indication display information for displaying predetermined range indication information at a position in the graph, the position indicating a display range being a range of the information indicated by the search result information, and
   the terminal device includes
   a search condition transmission unit that transmits the search condition to the information search device,
   an information reception unit that receives the search result information, the graph display information, and the range indication display information transmitted from the information search device,
   a search result display unit that displays the search result information,
   a graph display unit that displays the graph based on the graph display information, and a range indication information display unit that displays the range indication information at a position in the graph, the position indicating the display range on the basis of the range indication display information.

22. The information search system according to claim 21, wherein the information search device further includes a storage unit that stores values of the presentation item in association with respective pieces of the information, wherein the graph display information transmission unit transmits the graph display information including the values corresponding to the information that has been searched for by the information search unit, and the graph display unit displays the graph based on the values included in the graph display information.

23. The information search system according to claim 21, wherein the information search device further includes a storage unit that stores values of the presentation item in association with respective pieces of the information, and an image data generation unit that generates image data which represents the graph on the basis of the values corresponding to the information that has been searched for by the information search unit as the graph display information, wherein the graph display unit displays an image of the graph based on the image data.

\* \* \* \* \*